(12) United States Patent
Low et al.

(10) Patent No.: US 12,055,125 B2
(45) Date of Patent: Aug. 6, 2024

(54) APPARATUS AND METHOD FOR ADJUSTING A WIND TURBINE SYSTEM, AND MAST OF A WIND TURBINE SYSTEM

(71) Applicant: Seatrium (SG) Pte. Ltd., Singapore (SG)

(72) Inventors: Chin Hui Low, Singapore (SG); Xiao Li Chia, Singapore (SG); Nicolaas J. Vandenworm, Houston, TX (US); Shuo Wang, Singapore (SG)

(73) Assignee: SEATRIUM (SG) PTE. LTD., Singapore (SG)

( * ) Notice: Subject to any disclaimer, the term of this patent is extended or adjusted under 35 U.S.C. 154(b) by 42 days.

(21) Appl. No.: 17/784,714

(22) PCT Filed: Jan. 5, 2021

(86) PCT No.: PCT/SG2021/050003
§ 371 (c)(1),
(2) Date: Jun. 13, 2022

(87) PCT Pub. No.: WO2021/141534
PCT Pub. Date: Jul. 15, 2021

(65) Prior Publication Data
US 2023/0034804 A1 Feb. 2, 2023

(30) Foreign Application Priority Data
Jan. 7, 2020 (SG) .......................... 10202000122R

(51) Int. Cl.
*F03D 13/10* (2016.01)
*B66F 3/46* (2006.01)
(Continued)

(52) U.S. Cl.
CPC ................ *F03D 13/10* (2016.05); *B66F 3/46* (2013.01); *F03D 13/25* (2016.05); *F03D 13/40* (2016.05);
(Continued)

(58) Field of Classification Search
CPC .......... F03D 13/10; F03D 13/25; F03D 13/40; F03D 13/22; B66F 3/46; F05B 2230/6102;
(Continued)

(56) References Cited

U.S. PATENT DOCUMENTS 1,046,541 A * 12/1912 Bates ........................ C01B 3/36
48/197 R
8,601,748 B2 * 12/2013 Delago ................... F03D 13/10
52/119

(Continued)

FOREIGN PATENT DOCUMENTS

| GB | 2561612 A | 10/2018 |
| WO | WO-2019/204895 A2 | 10/2019 |

*Primary Examiner* — Ryan J. Walters
(74) *Attorney, Agent, or Firm* — Morse, Barnes-Brown & Pendleton, P.C.; Martin Z. Zhang, Esq.

(57) ABSTRACT

According to embodiments of the present invention, an apparatus for adjusting a wind turbine system is provided. The apparatus includes a structure including a top surface opening and a bottom surface opening opposite to the top surface opening, the structure configured to receive a mast of the wind turbine system through the top surface opening and the bottom surface opening; a jacking mechanism operable to raise or lower the structure with respect to the mast; and a locking mechanism configured to releasably secure the structure to the wind turbine system. According to further embodiments, a mast of a wind turbine system, a system including the apparatus and the mast, and a method for adjusting a wind turbine system are also provided.

20 Claims, 14 Drawing Sheets

(51) Int. Cl.
*F03D 13/25* (2016.01)
*F03D 13/40* (2016.01)

(52) U.S. Cl.
CPC ... *F05B 2230/6102* (2013.01); *F05B 2240/93* (2013.01); *F05B 2240/95* (2013.01)

(58) Field of Classification Search
CPC .. F05B 2240/93; F05B 2240/95; Y02E 10/72; Y02E 10/727; Y02P 70/50
See application file for complete search history.

(56) References Cited

U.S. PATENT DOCUMENTS

| | | | |
|---|---|---|---|
| 8,959,870 B2 * | 2/2015 | Schmidt | F03D 13/20 52/118 |
| 9,180,941 B1 | 11/2015 | Vandenworm | |
| 9,297,206 B2 | 3/2016 | Vandenworm | |
| 10,300,993 B2 | 5/2019 | Vandenworm | |
| 2007/0243063 A1 * | 10/2007 | Schellstede | E02D 27/42 416/10 |
| 2012/0131880 A1 * | 5/2012 | Delago | E04H 12/342 52/745.18 |
| 2013/0091784 A1 * | 4/2013 | Schmidt | F03D 80/88 52/115 |
| 2014/0311085 A1 * | 10/2014 | Fernandez Gomez | E04H 12/34 52/745.18 |

\* cited by examiner

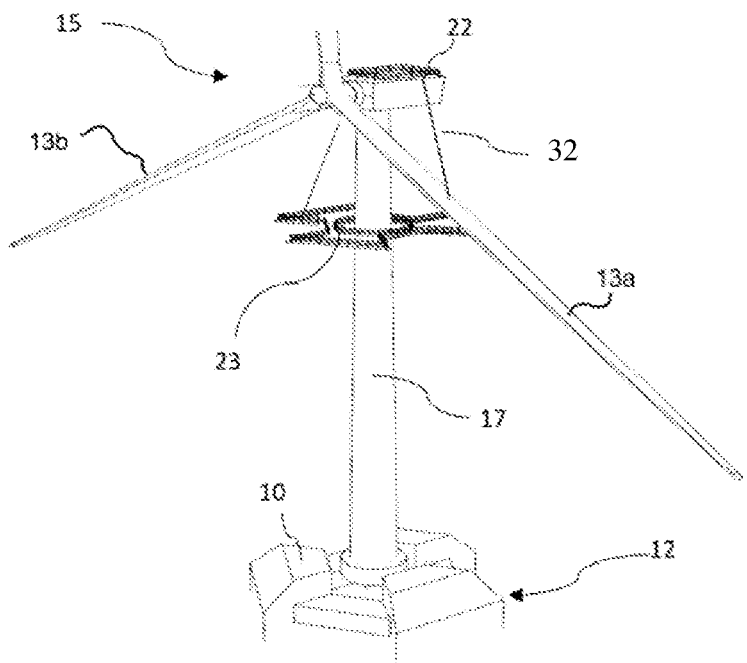
FIG. 12
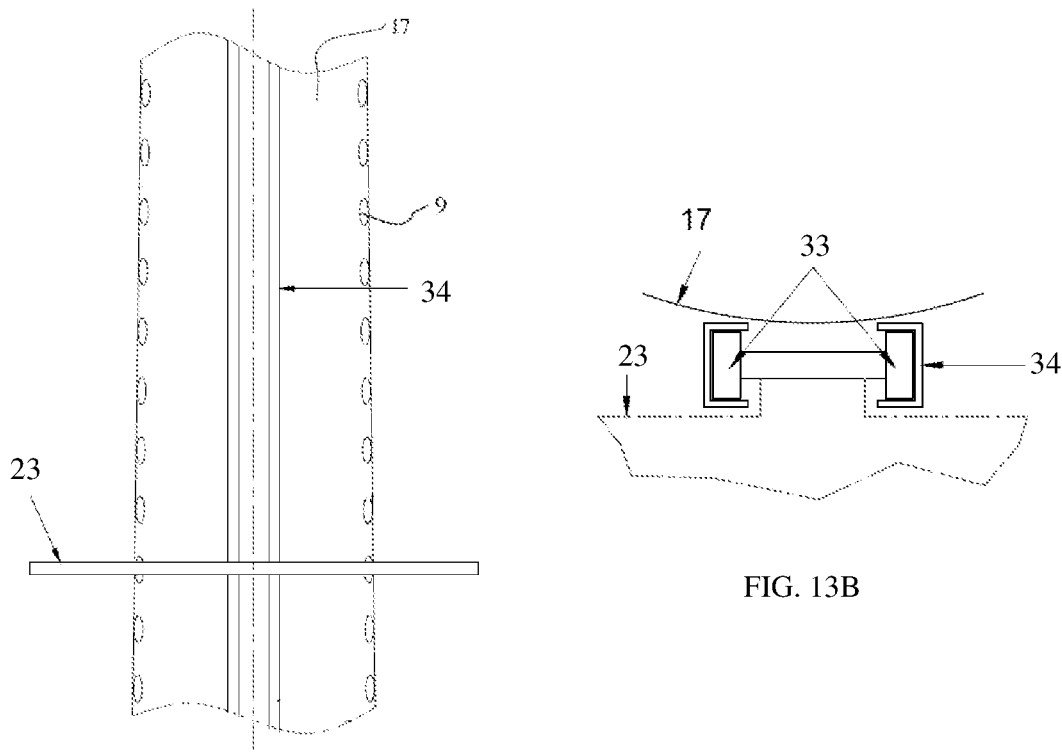
FIG. 13A
FIG. 13B

APPARATUS AND METHOD FOR ADJUSTING A WIND TURBINE SYSTEM, AND MAST OF A WIND TURBINE SYSTEM

CROSS-REFERENCE TO RELATED APPLICATIONS

This application is the National Phase of International Patent Application No. PCT/SG2021/050003, filed 5 Jan. 2021, which claims the benefit and priority of Singapore patent application No. 10202000122R, filed 7 Jan. 2020, the contents of it both being hereby incorporated by reference in its- their entirety for all purposes.

TECHNICAL FIELD

Various embodiments relate to an apparatus for adjusting a wind turbine system, a method for adjusting a wind turbine system, a mast of a wind turbine system, and a system including the apparatus and the mast.

BACKGROUND

Inspection and maintenance of wind turbines are important in order to ensure that the wind turbines are at optimal conditions to capture wind energy. Wind turbines may tower over 50 m or more in height. Inspection and maintenance of wind turbines that are provided on hulls for offshore use are especially challenging due to the harsh environmental conditions to which the hulls may be exposed to.

The existing approach for inspection and maintenance of wind turbines provided on hulls involves a third party crane barge that engages a crane and a personnel lifting basket to hoist a personnel and/or equipment and material to the wind turbines located at great heights.

There is therefore a need to reduce the current maintenance practices of high elevated work, exposing offshore crew to a harsh and dangerous environment, thereby addressing at least the problems mentioned hereinabove.

For example, a need exists for a method and an apparatus to facilitate inspections, maintenance, installation and repairs on rotor blades of wind turbines to be carried out in a safest manner.

A further need exists for a method and an apparatus for conducting inspections, maintenance of wind turbines wherein the offshore personnel conducting the tasks of inspecting the nacelle and engine room are not exposed to dangerous environmental conditions at extreme heights in the offshore theater around the globe.

SUMMARY

According to an embodiment, an apparatus for adjusting a wind turbine system is provided. The apparatus may include a structure comprising a top surface opening and a bottom surface opening opposite to the top surface opening, the structure configured to receive a mast of the wind turbine system through the top surface opening and the bottom surface opening; a jacking mechanism operable to raise or lower the structure with respect to the mast of the wind turbine system; and a locking mechanism configured to releasably secure the structure to the wind turbine system.

According to an embodiment, a method for adjusting a wind turbine system is provided. The method may include receiving a mast of the wind turbine system through a top surface opening and a bottom surface opening of a buoyant structure, the bottom surface opening being opposite to the top surface opening; raising or lowering the structure with respect to the mast of the wind turbine system; and releasably securing the structure to the wind turbine system.

According to an embodiment, a mast of a wind turbine system is provided. The mast may include a mating element configured to releasably couple to a complementary mating component provided by a structure, wherein the mast is configured to be received by the structure through a top surface opening of the structure and a bottom surface of the structure, the bottom surface being opposite to the top surface opening; and the mating element and the complementary mating component are configured to facilitate an operation of a jacking mechanism disposed on the structure to raise or lower the structure with respect to the mast.

According to an embodiment, a system is provided. The system may include an apparatus according to various embodiments, and a mast according to various embodiments, wherein the apparatus and the mast are configured to work cooperatively with each other to raise or lower the mast with respect to the structure of the apparatus, or to lock the mast to the structure.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 12 shows a partial perspective schematic view of a tower/mast with a sky walk deck in a position to conduct inspection, repair on rotor blades, nacelle and engine room of the wind turbine system, according to another embodiment.

FIG. 13A shows a partial side schematic view of a mast channel assembly, according to one embodiment.

FIG. 13B shows an expanded top schematic view of a roller assembly using in the mast channel assembly of FIG. 13A.

DETAILED DESCRIPTION

Figure 1A:
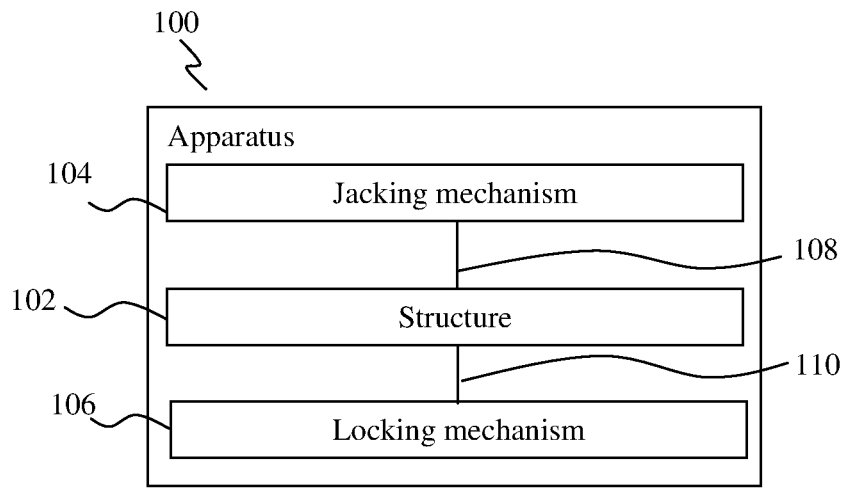
FIG. 1A shows a schematic view of an apparatus for adjusting a wind turbine system, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" or "substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may relate to using offshore wind turbine system on a variety of hulls. For example, the wind turbine system may be configured to be affixed to a variety of offshore structures for offshore use, or a variety of non-offshore structures. Some embodiments may be applicable for offshore wind turbine applications, to be positioned on a plurality of buoyant structures or on a plurality of piled structures. Using safe operations for an offshore wind turbine system may also be provided. It should be appreciated and understood that other embodiments may be applicable for non-offshore (i.e. onshore) wind turbine applications, to be positioned on a plurality of structures that are disposed on land surfaces.

Various embodiments may relate to a method and a novel system to conduct installation and maintenance for the wind energy and other than hydrocarbon industries, in support of a structure, a mast/tower and rotor blade swivel system. Such method and system enable the wind turbine to be adjusted (e.g. brought down) for installation, maintenance and/or repair purposes, which in turn, reduce installation, maintenance and/or repair costs and turnaround time. In relation to onshore wind turbine applications, the wind turbine system may be disposed over a well or at an elevated position to allow the mast of the wind turbine system to be lowered, with at least part of the mast extending downwardly away from the structure.

FIG. 1A shows a schematic view of an apparatus 100 for adjusting a wind turbine system, according to various embodiments. In FIG. 1A, the apparatus 100 includes a structure 102 including a top surface opening and a bottom surface opening opposite to the top surface opening, the structure 102 configured to receive a mast (or interchangeably referred to as tower) of the wind turbine system through the top surface opening and the bottom surface opening; a jacking mechanism 104 operable to raise or lower the structure 102 with respect to the mast of the wind turbine system; and a locking mechanism 106 configured to releasably secure the structure 102 to the wind turbine system. The wind turbine system and its components are not shown in FIG. 1A, however reference may be made to other figures (e.g. FIGS. 2 to 14). The structure 102 may be coupled to the jacking mechanism 104 as depicted by line 108, and to the locking mechanism 106 as depicted by line 110. In the context of various embodiments, the term "coupled" may mean fixed, arranged to work with, or in communication with.

In other words, the wind turbine system (or wind turbine structure or wind turbine assembly) coupled or connected to a main top surface of the structure 102. The structure 102 may be positioned to accommodate the lowering of the tower/mast(s) and the swivel of the wind turbine system into a safe docking position close to the main top surface area. Lowering the tower/mast(s), blades, and nacelle of the wind turbine system into the docking position significantly improves the overall safety climate and contributes to a much safer operation for work personnel. At the same time, turnaround time for maintenance may be significantly reduced, thereby avoiding or at least minimizing down time. The structure 102 may also be configured to raise the tower/mast away from the main top surface of the structure to resume the offshore wind turbine system to an operational position.

In various embodiments, the jacking mechanism 104 may include a hydraulic jacking mechanism. In other words, the tower/mast of the wind turbine system may be positioned on the top surface of the structure 102 at a location that supports the lowering and raising of the mast, for example, with hydraulic—electric operating jack systems/jacking mechanism 104. By lowering the mast, the jacking mechanism 104 facilitates in bringing down the total height of the wind turbine system. The jacking mechanism 104 may include a plurality of inner jacks and a plurality of outer jacks. The plurality of inner jacks and the plurality of outer jacks may be arranged extending upwardly from the structure 102 and spaced apart in elevation from each other.

For example, the plurality of inner jacks may be arranged at or near a level of the top surface of the structure 102, while the plurality of outer jacks may be arranged at a height or an elevation away from the top surface of the structure 102. This arrangement may be applicable if the plurality of inner jacks and outer jacks may be of similar type or built in term of the amounts of extension the jacks may provide. In another example, if the outer jacks were able to provide a sufficiently larger amount of extension as compared to the inner jacks, then the plurality of outer jacks and the plurality of inner jacks may be both arranged at or near the level of the top surface of the structure 102.

The plurality of inner jacks and outer jacks may be arranged along a direction of a longitudinal axis of the mast of the wind turbine system. Thus, the plurality of inner jacks and the plurality of outer jacks may be stroke up or stroke down along the direction that is substantially parallel to the longitudinal axis of the tower/mast (in other words, along the length of the tower/mast) while accommodating the 'speed' to lower and raise the tower/mast.

Each of the inner jacks and the outer jacks may include a piston configured to extend outwardly and engage a complementary mating element (e.g. 142 of FIG. 1C) provided along the mast of the wind turbine system. The complementary mating element may include a complementary orifice or an anchor hole. A plurality of complementary mating elements may be provided along the mast of the wind turbine system. If the plurality of complementary mating elements is provided longitudinally along one straight line of the mast, the plurality of inner jacks may be arranged aligned with the plurality of outer jacks so that the inner jacks and outer jacks are able to assess the complementary mating elements along the same line. In another example, if the plurality of complementary mating elements is provided longitudinally along separate straight lines of the mast, the plurality of inner jacks may be laterally spaced from the plurality of outer jacks so that the inner jacks are able to assess the complementary mating elements along one line, while the outer jacks are able to assess the complementary mating elements along another line. As the structure 102 may provide a stable working platform, the structure 102 may have space for the inner and/or outer jacks to be positioned on the top surface or at a dedicated space in or near an opening location within the structure 102.

In a different embodiment, the jacking mechanism 104 may include a rack and pinion mechanism.

In one embodiment, the locking mechanism 106 may be provided within the structure 102, or more specifically an intermediate surface of the structure 102. In other words, the locking mechanism 106 may be located underneath the jacking mechanism 104. In a different example, components of the jacking mechanism 104 may provide for jacking operations as well as facilitate the locking mechanism 106. The locking mechanism 106 may be configured to releasably secure the structure to the wind turbine system after the mast is lowered or raised.

In various embodiments, the structure 102 may include a buoyant structure including a hull having an outer hull shape selected from the group consisting of circular, ellipsoid and geodesic horizontal cross-section. Such circular or ellipsoid or geodesic horizontal cross-section may be apparent at all levels. In such embodiments, the top surface opening may be referred to as a deck opening of the buoyant structure and the bottom surface opening may be referred to as a keel opening of the buoyant structure. For example, the buoyant structure may be as described in U.S. Pat. No. 10,300,993 granted on 28 May 2019 and/or U.S. Pat. No. 9,297,206 granted on 29 Mar. 2016.

The structure 102 may not be restricted or limited to having a hull, a planar keel with a lower cylindrical portion defining a hull, as the hull may include a plurality of columns connected to a lower hull portion.

For example, the plurality of columns may be configured to surround at least part of the wind turbine system, each column positioned spaced apart from one another and arranged with its longitudinal axis extending between the top surface opening and the bottom surface opening of the structure 102. An end or ends of each column may also be arranged along at least one of: at least part of a peripheral circumference of the top surface opening or at least part of a peripheral circumference of the bottom surface opening. In the context of various embodiments, the phrase "peripheral circumference" may be interchangeably referred to as circumferential peripheral or circumferential peripheral end. Each column may have a lateral or horizontal circular or polygonal cross-section. For example, the column(s) may have a circular or squarish or rectangular horizontal cross-section. The columns may be of the same or substantially similar height to that of the structure 102. The structure 102 may include a main top surface, a moonpool, and optionally a single or plurality of columns and may support a turbine tower/mast(s), rotor blades, nacelle, lowering and raising jacking (e.g. provided by the jacking mechanism 104) and a swivel system. The wind turbine system may be assembled in port and/or nearby sheltered offshore location prior to a mobilization location in shallow to ultradeep waters offshore, or onshore.

In one embodiment, the structure 102 may accommodate a second or mezzanine surface erected on the top surface to support the temporary resting of the wind turbine engine room. This significantly benefits the workers/personnel in terms of safety aspects.

The structure 102 may have a height of about 3 m to about 60 m.

In various embodiments, the apparatus 100 may further include a caisson configured to receive a rotor blade of a plurality of rotor blades of the wind turbine system, the caisson being installed onto the structure 102. The caisson may include a pocket for the rotor blade of the wind turbine system to park therein. The pocket may be constructed from a multitude of material products but not limited to steel and/or flexible malleable materials. The pocket may be interchangeably referred to as a maintenance enclosure, a storage pocket, a repair pocket or an inspection pocket. The pocket may provide protection from a possible dynamic induced wind and wave environment. The caisson may serve as or provide a maintenance enclosure for the rotor blade or space for a rotor blade to park in and to prevent water ingression, bringing the wind turbine system to a lower height.

The caisson may include a caisson opening for the rotor blade to enter into the caisson. The caisson opening may be arranged to be located under a rotation arc of the rotor blades. In other words, if one of the rotor blades is in a position substantially parallel to the mast of the wind turbine system, the caisson opening being located in line with the mast and under the rotation arc may receive the substantially parallel positioned rotor blade when the mast is lowered in a direction towards the top surface of the structure 102.

The caisson may further include a stairway to accommodate access to at least part of the received rotor blade. The stairway may be accessed at least via the caisson opening.

In some embodiments, the caisson may further include a sleeve (or casing) configured to encircle at least part of the mast of the wind turbine system. The sleeve may protect the mast from the environment when lowered during inspection and repair of the blades, nacelle and/or engine room. The sleeve may be vertically installed and may include a sleeve opening through which work personnel may access the mast.

In various embodiments, the apparatus 100 may further include a barrel assembly including a storage unit configured to hold a replacement rotor blade, a barrel configured to move the replacement rotor blade into the caisson for assembly onto the wind turbine system when performing a replacement of rotor blade for the wind turbine system, and a gear mechanism configured to operate movements, or more specifically, rotational movements of the barrel.

The caisson meant for protection and/or inspection has the ability to accommodate a new rotor blade (or interchangeably referred to as wind blade) vertically positioned and stored. The caisson may be included in a rotating magazine (i.e., the barrel) that may have slots (i.e., the storage unit(s)) for receiving the rotor blades. For example, a first rotor blade after inspection may rotate out of the caisson (after the tower/mast is being jacked up) to receive a second (new) rotor blade for inspection (with the tower/mast being lowered), thereby allowing the change out of rotor blades in a substantially horizontal or lateral manner, liken the situation of using a gun barrel. The rotating magazine may hold up to three "new" (replacement) blades and has storage space for two "old" (replaced) blades.

The barrel assembly may be operated using an electric hydraulic gear where the new blade may be rotated in a horizontal movement to the change out slot. The barrel assembly may be arranged within the structure 102 and surrounding at least part of a peripheral circumference of the mast. The barrel assembly may be operable to rotate around the peripheral circumference of the mast.

The storage unit may also hold a blade that may be used for replacement of a worn-out or damaged blade in the wind turbine system.

In various embodiments, the apparatus 100 may further include a robotic arm or manipulator configured to assemble the replacement rotor blade onto the wind turbine system. For example, intelligent (directed) robotic manipulators may be able to align the replacement rotor blade and torque up bolts to couple to a nacelle of the wind turbine system.

The jacking mechanism 104 and/or the locking system 106 and/or the barrel assembly and/or the robotic arm may be operated using a battery or a stored electric energy source located on the structure 102 that activates hydraulic and electric motors that initiate the lowering/raising of the mast, the movement of the barrel and/or the operation of the robotic arm.

In some embodiments, the top surface of the structure 102 may accommodate a blade resting place. Such blade resting place may be similar to boom rests that allow the rotor blade to safely secure in order to conduct remote or with onshore operating crew inspection of the full assembly. The top surface may also support an external horizontal installed container for blades housing that allows for one of the rotor blades to be changed out safely. The container may accommodate new rotor blades that are horizontal positioned and stored. Using a magazine, for example, like a "gun barrel" that rotates, may allow a set of robotic controlled clamping arms to align and place a new rotor blade in line with a bolts assembly position. For example, the container may hold up to three "new" rotor blades and may have storage space for two "old" rotor blades.

In various embodiments, the apparatus 100 may further include a swivel mechanism configured to adjust an assembly including rotor blades, a nacelle and an engine room of the wind turbine system between an operational position to a docking position. At the operational position, the rotor blades are at a 0-180 degree position along a vertical plane that is substantially parallel to a longitudinal axis of the mast, and at the docking position, the rotor blades are positioned along a tilted plane at an angle with respect to the longitudinal axis of the mast, the angle being more 0 degree but less than 180 degree (in other words, between 0 degree and 180 degree but not inclusive of the two limits). This swivel mechanism may further bring down the total height of the wind turbine system. The incorporation of the swivel mechanism (or interchangeably referred to as a swivel or swivel like mechanism) is to turn the rotor blade(s) as much as possible to further bring down the total height of the wind turbine system. Ideally, the rotor blade(s) may be turned facing the sky so as to maximize the total height being brought down.

In various embodiments, the apparatus 100 may further include a hoisting support platform configured to provide access to the mast of the wind turbine system. The hoisting support platform may be lifted up or down alongside the mast, for example, by wind wires. The hoisting support platform may be arranged surrounding at least part of the circumferential peripheral of the mast.

Figure 1B:
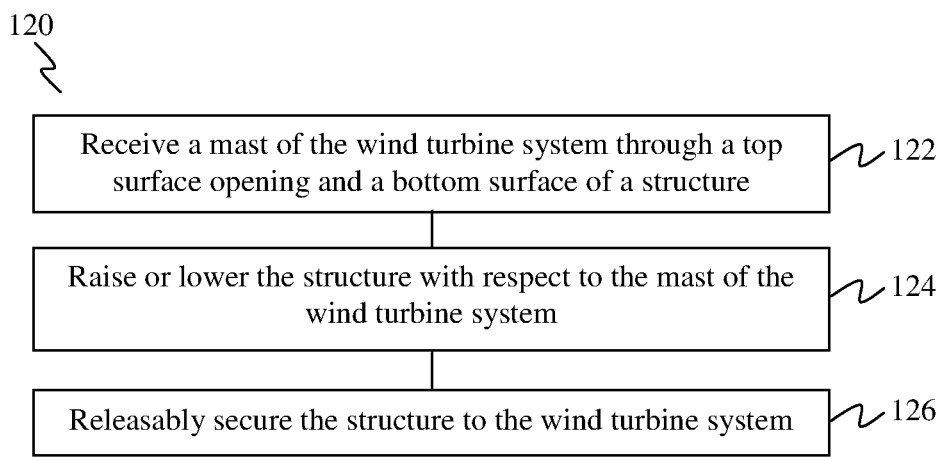
FIG. 1B shows a flow chart illustrating a method for adjusting a wind turbine system, according to various embodiments.
Figure 1C:
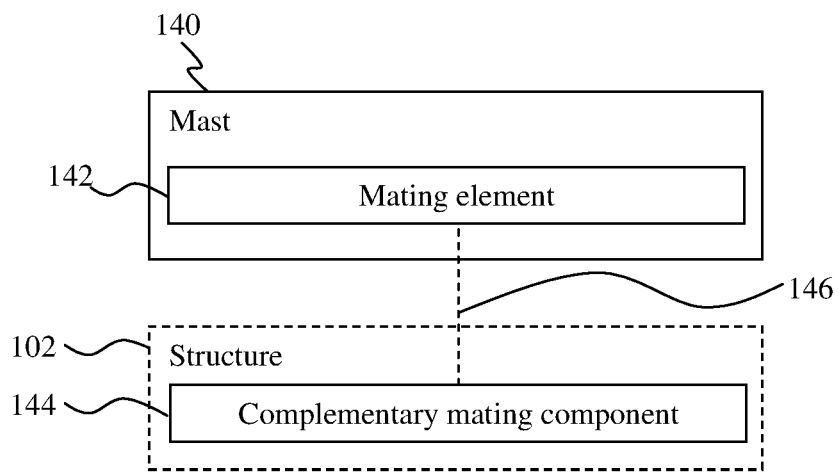
FIG. 1C shows a schematic view of a mast of a wind turbine system, according to various embodiments.

FIG. 1C shows a schematic view of a mast 140 of a wind turbine system, according to various embodiments. In FIG. 1C, the mast 140 may include a mating element 142 configured to releasably couple to a complementary mating component 144 provided by a structure (e.g. the structure 102 of FIG. 1A), as shown by a line 146. The mast 140 (or interchangeably referred to as tower) may be configured to be received by the structure 102 through a top surface opening of the structure 102 and a bottom surface of the structure 102, the bottom surface being opposite to the top surface opening; and the mating element 142 and the complementary mating component 144 may be configured to facilitate an operation of a jacking mechanism (e.g. 104 of FIG. 1A) disposed on the structure 102 to raise or lower the structure 102 with respect to the mast 140.

In one embodiments, the mating element 142 may include an orifice provided along the mast 140 and configured to couple to the complementary mating component 144 that includes a piston at an extended configuration, the piston being provided by the jacking mechanism 104. In other words, the tower/mast 140 may have an outer shape that accommodates the mating element(s) 142 in form of anchor holes (orifices) positioned along a full (substantially entire) length of an exterior body of the tower/mast 140 in line with the jacking mechanism 104. Each anchor hole may be positioned spaced apart at a distance away from a neighboring anchor hole. The tower/mast 140 may have a shape profile that accommodates a gear system and winches as part of an electric hydraulic lowering and raising hardware.

In a different example, the mating element 142 may vice versa be a projecting part provided along the mast. In such a case, each inner jack and outer jack of the jacking mechanism 104 may include a complementary recess configured to receive the projecting part, and the inner jacks and the outer jacks may be required to move the respective complementary recesses towards and secure to the projecting part(s), or away and release from the projecting part(s).

Figure 1D:
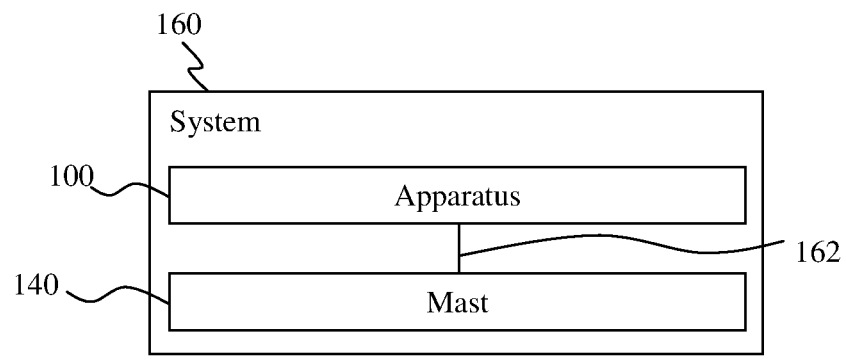
FIG. 1D shows a schematic view of a system including the apparatus of FIG. 1A and the mast of FIG. 1C, according to various embodiments.

FIG. 1D shows a schematic view of a system 160, according to various embodiments. In FIG. 1D, the system 160 may include an apparatus 100 (FIG. 1A) and a mast 140 (FIG. 1C), according to various embodiments. In system 160, the apparatus 100 and the mast 140 may be configured to work cooperatively with each other to raise or lower the mast 140 with respect to the structure 102 of the apparatus 100, or to lock the mast 140 to the structure 102.

Various embodiments may relate to a method for inspection, repair and maintenance of an offshore wind turbine system that includes a tower/mast, rotor blades, nacelle and engine room. The method for inspection, repair and maintenance of the offshore wind turbine system may involve a unique combination of sequential steps allowing elevating of the mast/tower, with protective storage of one or a plurality of the rotor blades while providing main deck access to the engine room, thereby creating and extremely safe working environment.

FIG. 1B shows a flow chart illustrating a method 120 for adjusting a wind turbine system, in accordance with various embodiments. At Step 122, a mast (e.g. 140 of FIG. 1C) of the wind turbine system is received through a top surface opening and a bottom surface opening of a structure (e.g. 102 in FIG. 1A). The bottom surface opening may be opposite to the top surface opening. At Step 124, the structure 102 is raised or lowered with respect to the mast 140 of the wind turbine system. At Step 126, the structure 102 may be releasably secured to the wind turbine system.

The method 120 may include the same or like elements or components as those described in the apparatus 100 of FIG. 1A and the mast 140 of FIG. 1C, and as such, the like elements may be as described in the context of the apparatus 100 of FIG. 1A and the mast 140 of FIG. 1C, and therefore the corresponding descriptions are omitted here.

In various embodiments, the method 120 may include raising and/or lowering the mast 140 of FIG. 1C of the wind turbine system via the apparatus 100 of FIG. 1A.

In an example where the structure 102 may be a buoyant structure, the step 122 of receiving the mast 140 may involve the wind turbine system to be assembled in port on a de-ballasted buoyant structure while maintaining a positive stable condition (or a positive stability where the buoyant structure tends to return to previous position when inclined). The wind turbine system and the de-ballasted buoyant structure may be mobilized to a named offshore location as the buoyant structure may ballast and safely secure to a final identified destination while maintaining the positive stable condition.

The step 124 of raising or lowering the structure 102 may include operating a hydraulic jacking mechanism (e.g. 104 in FIG. 1A) including a plurality of inner jacks and a plurality of outer jacks. The plurality of inner jacks and the plurality of outer jacks may be arranged extending upwardly from the structure 102 and spaced apart in elevation from each other.

More specifically, the plurality of inner jacks may be extending upwardly from the top surface of the structure 102.

In one embodiments, the step 124 of raising the structure 102 may include disabling a locking mechanism (e.g. 106 of FIG. 1A) to release engagement between the structure 102 and the wind turbine system (e.g. the mast 140), extending a piston of at least one inner jack to engage a first complementary orifice (e.g. a mating element 142 of FIG. 1C) provided along the mast 140 of the wind turbine system, and retracting the at least one inner jack. The at least one inner jack may be retracted a fully retracted position which is a position where the at least one inner jack is unable to retract further.

The step 124 of raising the structure 102 may further include e.g. after reaching the fully retracted position, retracting the piston of the at least one inner jack to release engagement with the first complementary orifice, extending a piston of at least one outer jack to engage a second complementary orifice (e.g. another mating element 142 of FIG. 1C) provided along the mast 140 of the wind turbine system, and retracting the at least one outer jack. The at least one outer jack may be retracted a fully retracted position which is a position where the at least one outer jack is unable to retract further. The retraction of the piston of the at least one inner jack and the extension of the piston of the at least one outer jack may occur substantially simultaneously.

For enhanced security purposes, the piston of at least one inner jack may further be extended to engage a third complementary orifice (e.g. yet another mating element 142 of FIG. 1C) provided along the mast 140 of the wind turbine system to assume a final position to perform maintenance of the wind turbine system. This configuration may provide the locking mechanism 106 of FIG. 1A.

The jacking mechanism 104 may be portable and may be used to bring the mast 140 down during maintenance. By raising the structure 102 with respect to the mast 140 of the wind turbine system, the mast 140 is effectively being lowered toward the top surface of the structure 102. The lowering of the mast 140 may transfer the height (length) of the rotor blades to the top surface area as the mast 140 may extent below the bottom surface of the structure 102. The ability to lower the mast 140 and thus the full wind turbine system to the top surface or close to the top surface of the structure 102 changes the current existing maintenance and repair operations. From a designated onshore location, an operator of the offshore wind turbine system may have the ability to control the orientation of rotor blade(s), nacelle, engine room of the wind turbine system, and the activation of the inner, stroke and engagement pistons to lower the mast 140. The electric hydraulic strokes allow the operator to start and stop at any time and at any elevate height of the mast 140. The method 120 may allow for the locking and docking of the rotor blade. The mast 140 in its lowest position may allow for the rotor blade to be remotely inspected by high definition cameras to perform inspection of paint and material indentations. While in the lowest position, the mast 140 may also allow for the nacelle and the parts in the turbine engine room to be inspected.

The mast 140 in its lowest position may provide extremely safe operating conditions as the caisson space holding the rotor blade and its bolts assembly is protected from the environment and in one example, this configuration may allow for the bolts to be disconnected and the old rotor blade to be changed out for a new rotor blade. For example, the change out of a rotor blade while the mast 140 is in the lowest position may involve the use of a lifting cradle/clamp that includes pre-set rotor blade molds in the form of a protected cassette container to support the rotor blade while it is being disconnected and hoisted to the top surface (or main deck) open space by the use of a knuckle boom crane or any crane-lifting device. Next, the rotor blade(s) may be accommodated for transfer to a supply vessel to exchange rotor blade(s).

In one embodiment, the step 124 of lowering the structure 102 may include retracting a piston of at least one inner jack to release engagement with a first complementary orifice (e.g. a mating element 142 of FIG. 1C) provided along the mast 140 of the wind turbine system; extending at least one outer jack with a piston of the at least one outer jack engaged with a second complementary orifice (e.g. another mating element 142 of FIG. 1C) provided along the mast of the wind turbine system, e.g. to a raised position; after reaching the raised position, retracting the piston of the at least one outer jack to release engagement with the second complementary orifice; and enabling a locking mechanism (e.g. 106 of FIG. 1A) to secure engagement between the structure 102 and the wind turbine system (or more specifically, the mast 140).

The enabling of the locking mechanism 106 may be done substantially simultaneously with the retraction the piston of the at least one outer jack or prior to this retraction.

The step 124 of lowering the structure 102 may further include prior to enabling the locking mechanism, extending the piston of the at least one inner jack to engage a third complementary orifice (e.g. yet another mating element 142 of FIG. 1C) provided along the mast 140 of the wind turbine system, extending the at least one inner jack, and retracting the piston of the at least one inner jack to release engagement with the third complementary orifice. The extension of the at least one inner jack may be to a fully raised position and done so while ensuring that the piston of the at least one outer jack is retracted to release engagement with the second complementary orifice. The retraction of the piston of the at least one inner jack may be done after the at least one inner jack reaches the fully raised position.

The locking mechanism 106 may provide at least a pin to lock the mast 140 at a fixed position during operation.

It should be understood and appreciated that the first complementary orifice, the second complementary orifice, and the third complementary orifice referred to in the raising of the structure 102 may not be the same as the first complementary orifice, the second complementary orifice, and the third complementary orifice referred to in the lowering of the structure 102. Such references of order (e.g. first, second and third) should be made within the context of raising the structure 102, separate to the context of lowering the structure 102, and vice versa.

By lowering the structure 102 with respect to the mast 140 of the wind turbine system, the mast 140 is effectively being raised away from the top surface of the structure 102.

In a different embodiment, the step 124 of raising or lowering the structure 102 may include operating a rack and pinion mechanism.

In various embodiments, the method 120 may further include receiving a rotor blade of a plurality of rotor blades of the wind turbine system in a caisson, the caisson being installed onto the structure 102.

The method 120 may further include moving a replacement rotor blade into the caisson by using a barrel assembly and assembling the replacement rotor blade onto the wind turbine system using a robotic arm or manipulator. The replacement rotor blade may be preloaded into a storage unit of the barrel assembly or may be loaded into the storage unit prior to moving into the caisson. The lowering of blades into the caisson or the loading of blades into the storage unit may be performed by a crane, or more specifically a deck crane in the case of an offshore buoyant structure.

In various embodiments, the method 120 may further include adjusting an assembly comprising rotor blades, a nacelle and an engine room of the wind turbine system between an operational position to a docking position, wherein at the operational position, the rotor blades are at a 0-180 degree position along a vertical plane that is substantially parallel to a longitudinal axis of the mast 140, and at the docking position, the rotor blades are positioned along a tilted plane at an angle with respect to the longitudinal axis of the mast 140, the angle being more 0 degree but less than 180 degree.

In other words, the rotor blade may tilt orientation from a vertical 0-180 degrees to a horizontal position between 0 degree and 180 degrees (not inclusive). More specifically, the method 120 may enable the rotor blades to be decoupled thereby allowing the rotor blades to adjust/tilt the operational vertical orientation arc of 0-180 degrees to an arc adjust/swivel at an angle between 0 and 180 degrees (not inclusive) so as to allow maintenance to be performed in a safe environment. In an example, the orientation of the full blades and their attachments are adjusted at the location of the nacelle to improve inspection of the rotor blades. The nacelle may have integrated rotation parts within, to allow coupling and de-coupling of rotor blade drive in order to tilt the full rotor assembly.

With the tilt of the rotor blades and the lowering of the mast 140, as previously discussed, the wind turbine system may be lowered to a lowest possible position.

In various embodiments, the method 120 may further include encircling at least part of the mast 140 of the wind turbine system with a sleeve of the caisson.

The method 120 may further include lifting up or down a hoisting support platform alongside the mast 140 of the wind turbine system to provide access to the mast 140. Such lifting up or down of the hoisting support platform may be carried out, for example, using wind wires.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

The apparatus 100, the mast 140 and the method 120 may be described in further details below using examples of a dynamic offshore wind mast/tower docking system for the production of renewable energy on a floating structure/buoyant structure, and a method of using the same, with reference to FIGS. 2 to 14. The apparatus may also be referred to as a tower/mast lifting and lowering system. Although these examples relate to the floating structure/buoyant structure, it should be understood and appreciated that similar descriptions may also be applicable to a structure fixed for onshore or offshore operations.

Figure 2:
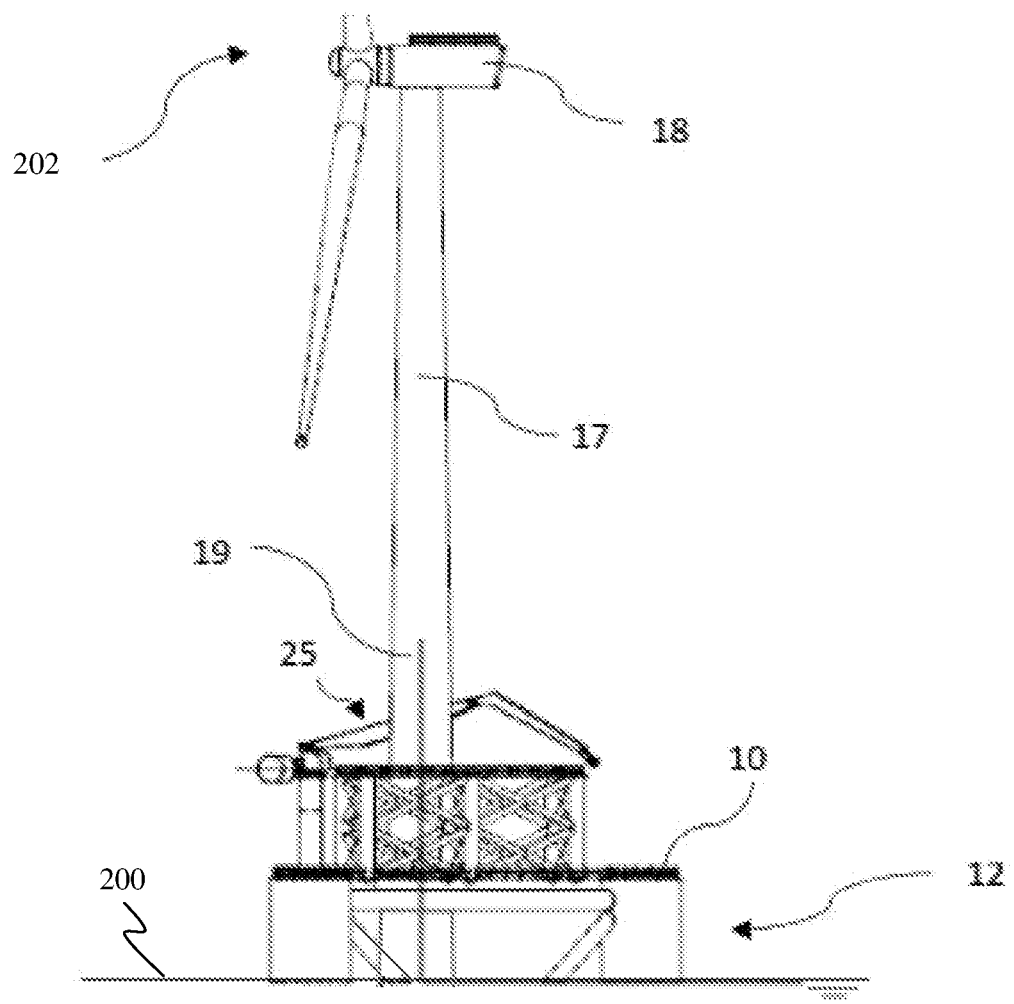
FIG. 2 shows a side schematic view illustrating partially the rotor blades, nacelle and engine room of a wind turbine system in an operational state, according to one embodiment.
Figure 3:
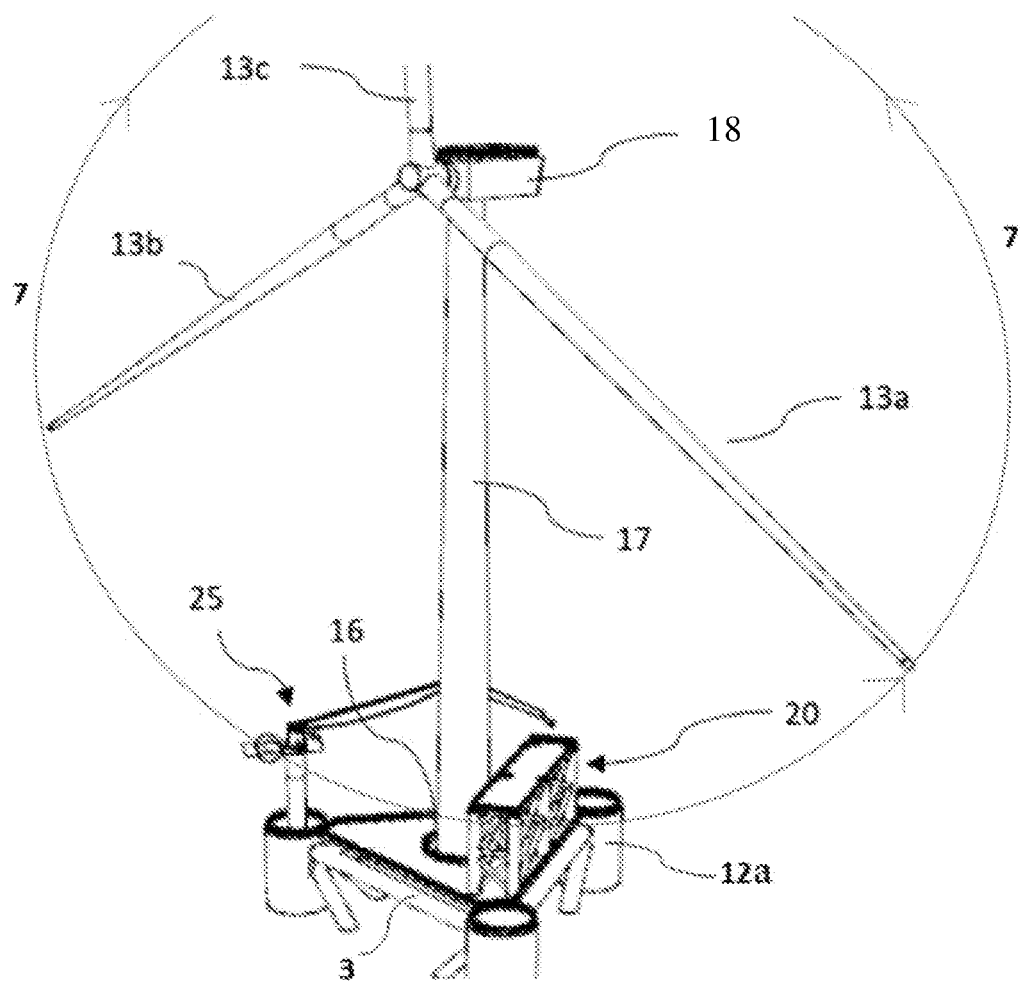
FIG. 3 shows a partial perspective schematic view of FIG. 2, illustrating a tower/mast orientation on a main deck.
Figure 4:
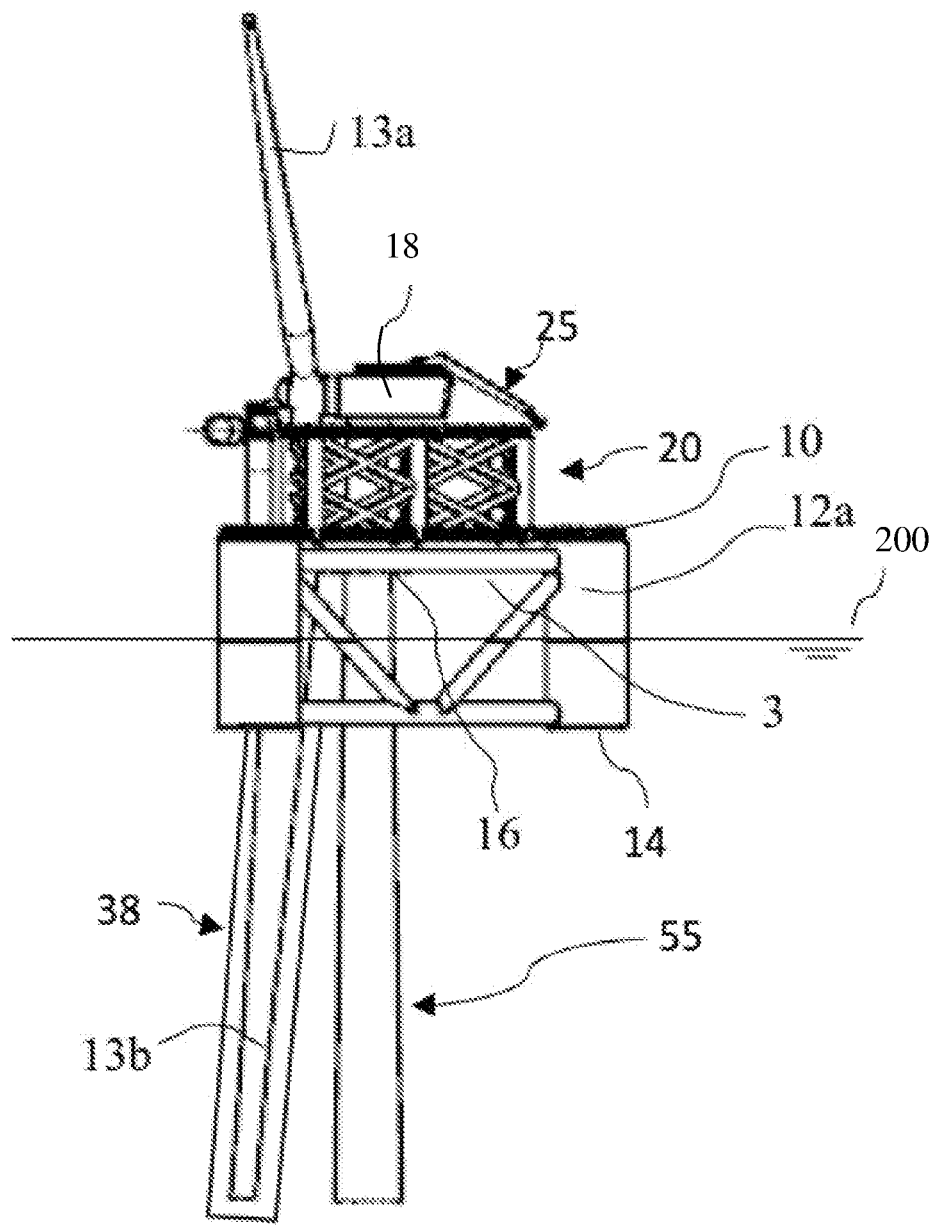
FIG. 4 shows a side schematic view illustrating partially the tower/mast, rotor blades, nacelle and engine room of a wind turbine system lowered to a maintenance position, according to one embodiment.

Referring to FIGS. 2 to 4, a buoyant structure 12 (in similar context to the structure 102 of FIG. 1A) includes a main deck 10, a keel 14, and one or a plurality of vertical hull openings 16 (e.g. in similar context to the top surface opening and bottom surface opening described with reference to the apparatus 100 of FIG. 1A), that accommodates a mast 17 (or may be referred to as a wind mast/tower, and in similar context to the mast 140 of FIG. 1C) configured to raise up and/or down freely. The buoyant structure 12 floats with an upper part of the buoyant structure 12 emerging above a sea level 200 and a lower part of the buoyant structure 12 under the sea level 200 (lower part being shown in FIG. 4). Deck cranes 25 may be located to support a supply of inventory and repair equipment and handle maintenance and repair activities on the buoyant structure 12.

Figure 5A:
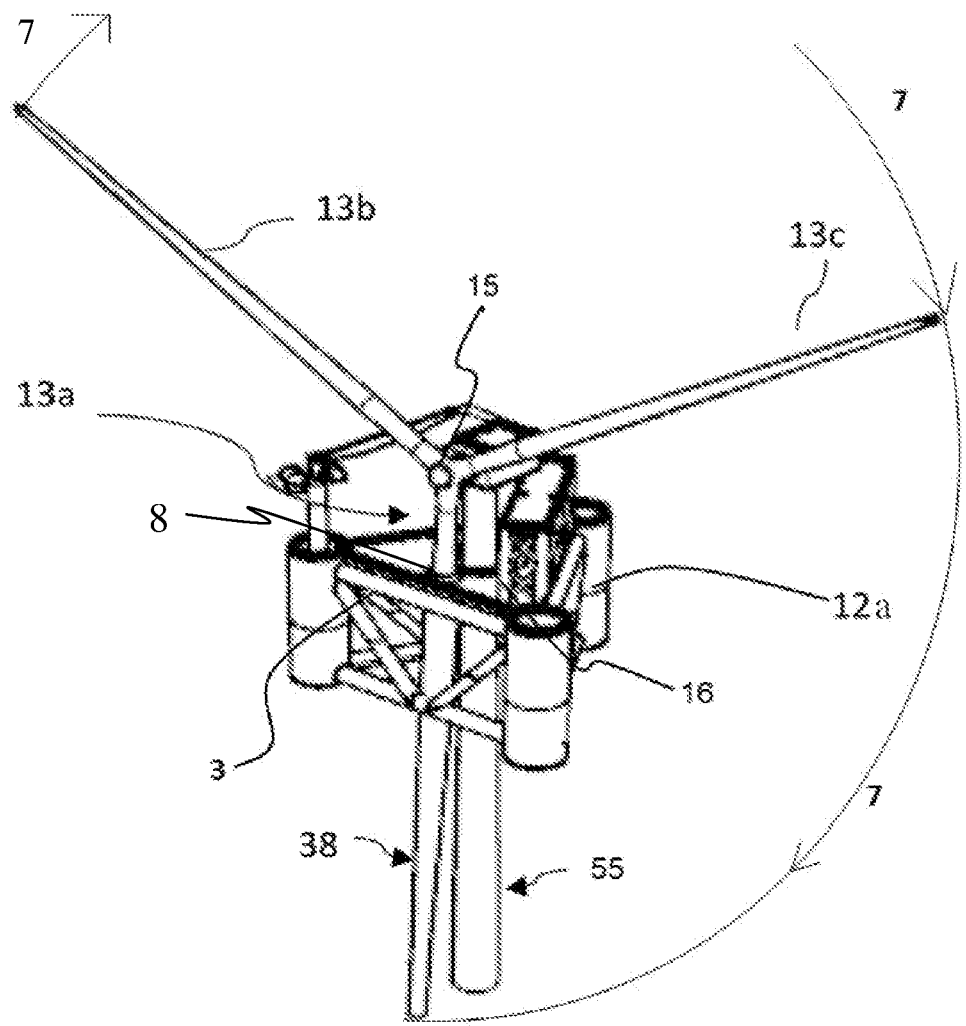
FIG. 5A show a perspective schematic view illustrating a maintenance position wherein the rotor blade is positioned in a protected caisson pocket, according to one embodiment.

As seen in FIG. 5A, a plurality of wind blades (or rotor blades or blades) of a wind turbine system 202 has one of the rotor blades 13a, 13b, 13c being directed into a caisson 38 that serves as a repair and storage pocket. The caisson 38 has an opening 8 that is located substantially in line with the mast 17, directly under the rotor blades 13a, 13b, 13c, and the rotation arc 7.

When a rotary assembly 15 is lowered in the direction towards the main deck 10, one of the rotor blades 13a, 13b, 13c enters the caisson 38 through the opening 8. The opening 8 may be at a level of the main deck (e.g. top surface of the structure 102), and the caisson 38 may be connected and protruding outwardly from a level of the keel 14 (e.g. bottom surface of the structure 102). The rotary assembly 15 including the engine room 18 may rest on an erected mezzanine work platform 20 (FIG. 4), allowing equipment and offshore workers safe and easy access. This may also provide simple access and reach by the deck cranes 25. The rotary assembly 15, including the rotor blades 13a, 13b, 13c, the nacelle 27 and the engine room 18, may be in a locked position at the nacelle location 27.

Figure 5B:
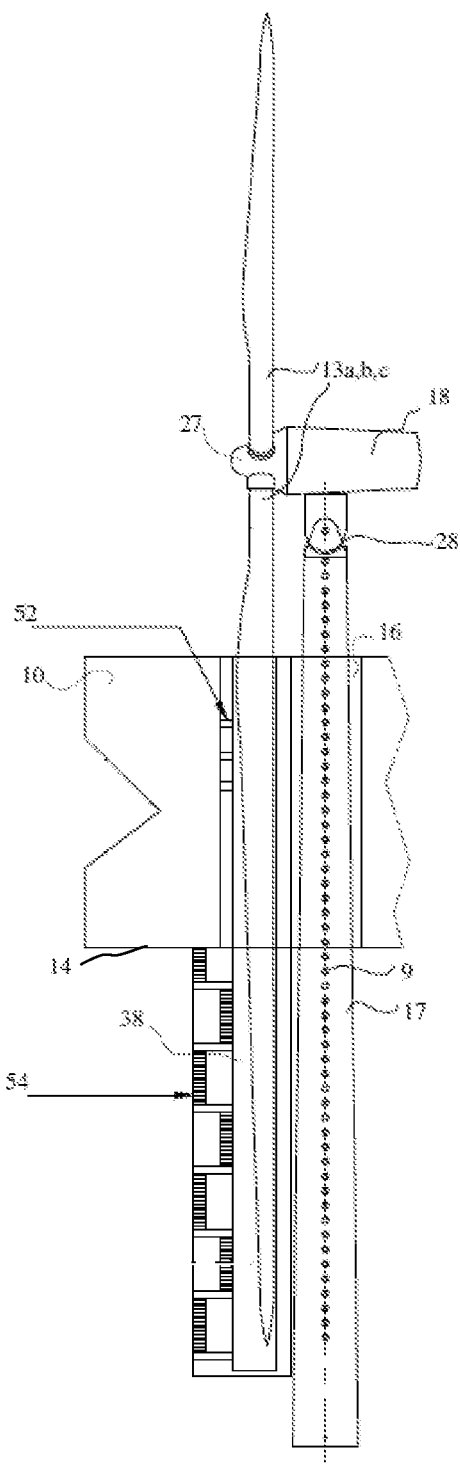
FIG. 5B show a partial side schematic view of FIG. 5A.

The caisson 38 may include stairways 54 as shown in FIG. 5B to accommodate access along a substantially full length of the rotor blades 13a, 13b, 13c.

Figure 6:
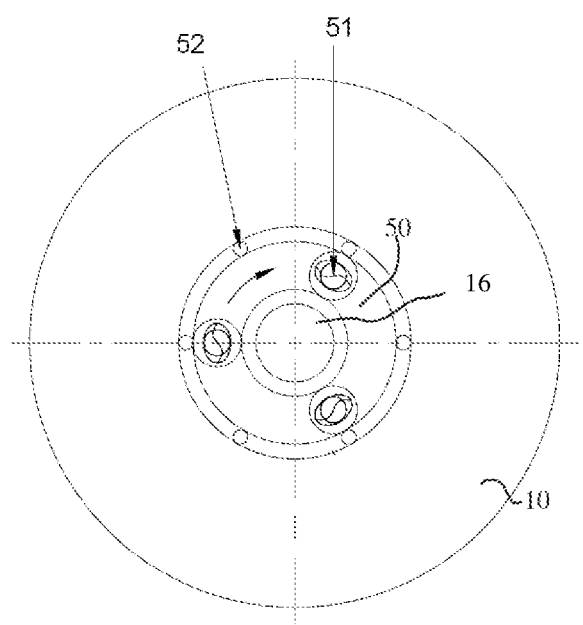
FIG. 6 shows a plan schematic view of a barrel system with a gear drive as seen downward on a main deck of the buoyant structure, according to one embodiment.

A barrel system 50 (or a barrel assembly) as shown in FIG. 6 rotates using a gear drive 52 as barrel system 50 has the ability to store one or a plurality of rotor blades (or may be referred to as replacement rotor blades) in a blade storage 51 (or may be referred to as a storage unit). In FIG. 6, the wind turbine system 202 is not shown for clarity purposes. These replacement rotor blades rotate using the gear drive 52 such that one of the replacement rotor blades may be positioned where robotic arms and manipulators are provided to assemble and bolt (replace) the replacement rotor blade as a new rotor blade for an old one (e.g. one of the rotor blades 13a, 13b, 13c).

As shown in FIGS. 4, 5A and 5B, the caisson 38 includes a vertical casing 55 with a deck opening 16 for the wind mast/tower 17 to protect from the environment when lowered during inspection and repair of the blades 13a, 13b, 13c, the nacelle 27 and the engine room 18 of the wind turbine system 202.

The buoyant structure 12 includes a hull 3 with a vertical axis 19. The outer hull may be characterized by an outer hull shape selected from the group consisting of circular, ellipsoid and geodesic shape in horizontal cross-sections at all levels. In some examples as shown in FIGS. 2 to 5A, the hull 3 may include a single or a plurality of circular, square, rectangular columns 12a, having column sections and the respective parts placed at right or curved angles. The columns 12a are coupled to another using beams to form a frame-like outer hull structure.

In other examples as shown in FIGS. 5B, 7A to 7C, the buoyant structure 12 may have a different hull structure 3a. The buoyant structure may include a main deck 10, a planar keel 14 defining a lower hull 4, and a cylinder portion 2. A single or plurality of columns (not shown in FIGS. 5B, 7A to 7C) may be connected to the planar keel 14, conforming and partaking in the buoyant/floating structure 12 having positive stability under all transit and operational conditions.

Figure 7A:
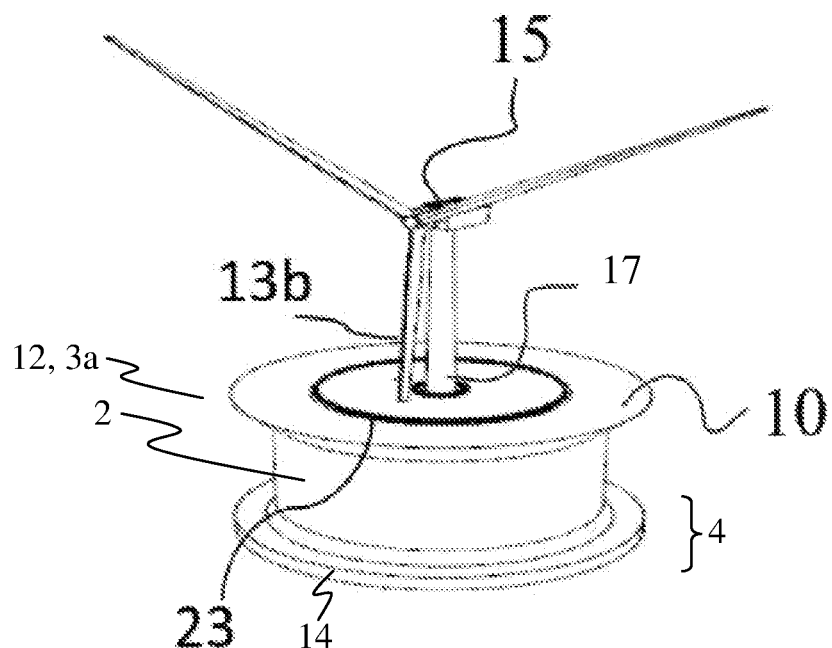
FIG. 7A shows a partial perspective schematic view illustrating rotor blades, nacelle and engine room of the wind turbine system in a maintenance position, according to one embodiment.
Figure 7B:
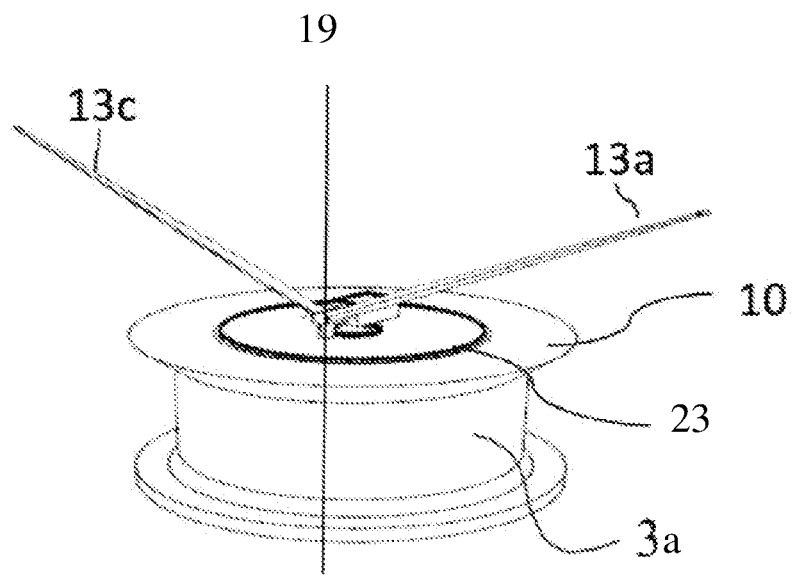
FIG. 7B shows a partial perspective schematic view illustrating rotor blades, nacelle and engine room of the wind turbine system in a repair position, according to one embodiment.
Figure 7C:
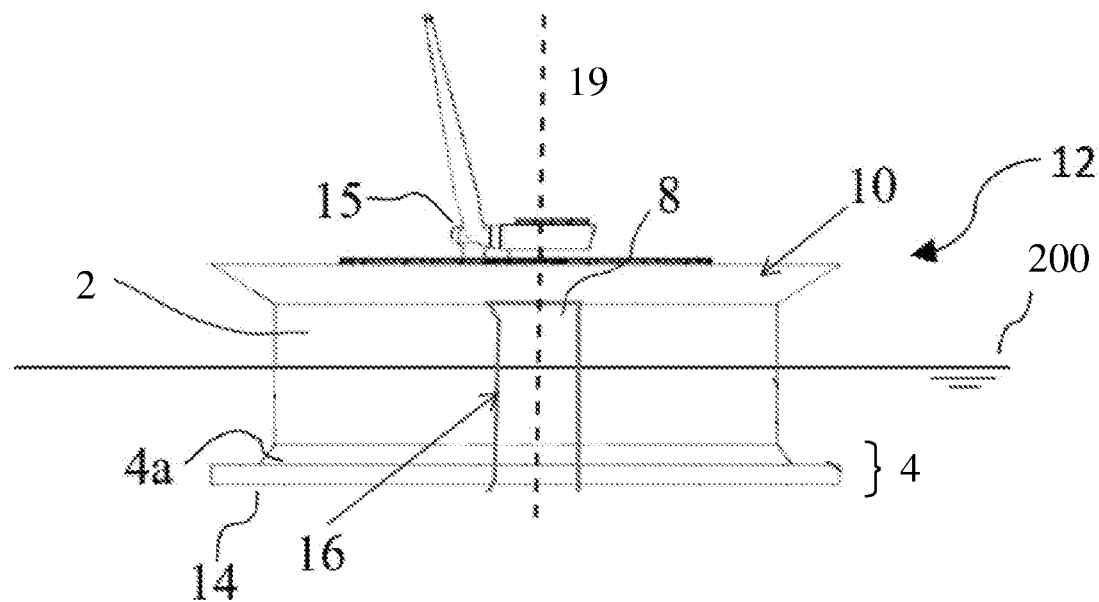
FIG. 7C shows a partial side schematic view of FIG. 7B.

In FIG. 7A, the mast 17 of the wind turbine system 202 is lowering toward the main deck 10 of the buoyant structure 102. At this point, the mast 17 may be in a maintenance position. The mast 17 may be completely lowered to a repair position as shown in FIGS. 7B and 7C. FIG. 7C shows a side view of the lowered mast 17 with respect to the buoyant structure 12. The outline of the hull opening 16 through the hull 3a is also shown for reference purpose. The main deck 10 of the buoyant structure may be tapered inwardly and downwardly, and coupled to the cylinder portion 2 at an upper end. The cylinder portion 2 extends downwardly from the main deck 10 and an lower end of the cylinder portion 2 may be coupled to an outwardly tapered portion 4a. The lower end of the cylinder portion 2 may be opposite to the upper end. The planar keel 14 may be coupled to the outwardly tapered portion 4a. The planar keel 14 may have a diameter that is larger than a diameter of the outwardly tapered portion 4a.

The wind mast/tower 17 may have an outer shape profile made out of multiple anchor holes 9, that allow outer jacks 10a and inner jacks 10b to engage with the tower/mast 17, thereby enabling lowering and raising of the wind mast/tower in a controlled manner. The lowering of the mast 17 using a hydraulic jacking mechanism 11 may be described in more details with reference to examples shown in FIGS. 8A to 8D.

Figures 8A, 8B:
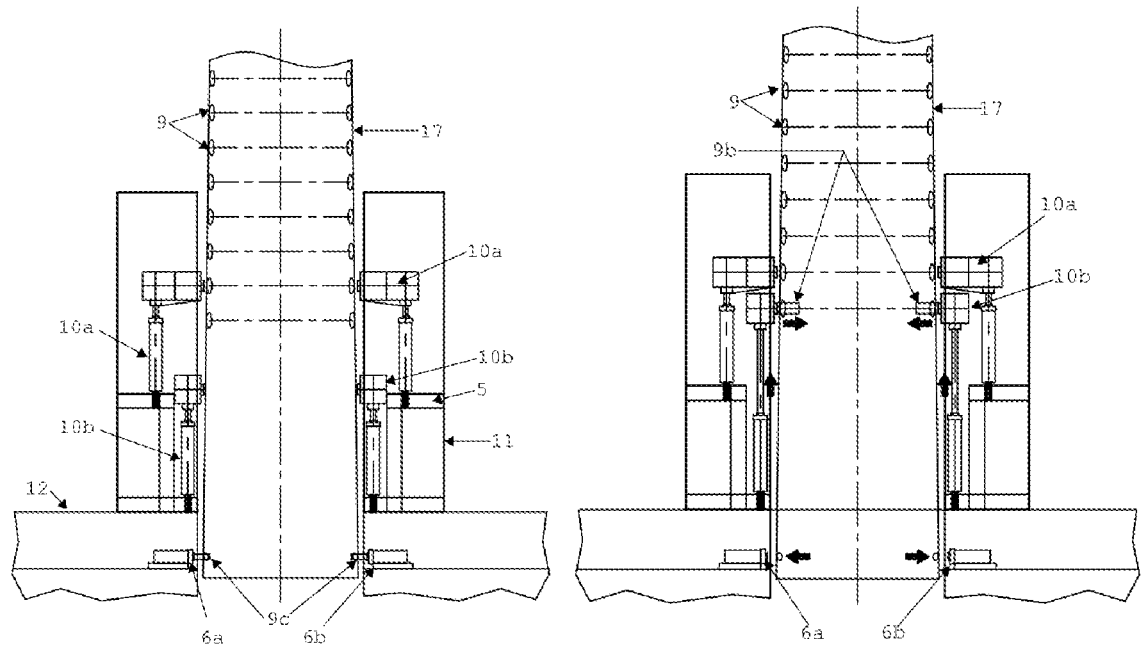
FIG. 8A shows a partial side schematic view of a tower/mast lifting and lowering system at an initial position of a jacking system/mechanism, according to one embodiment.
FIG. 8B shows the partial side schematic view of FIG. 8A where inner jacks stroked up and pistons engaged through anchor holes on the tower.
Figure 8C:
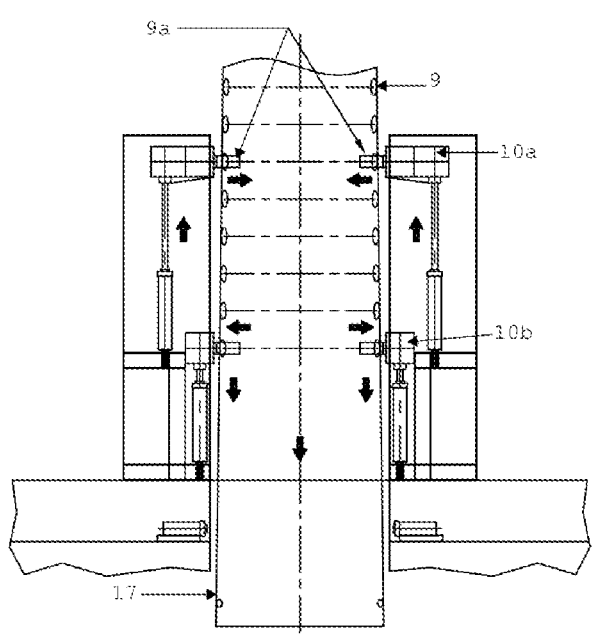
FIG. 8C shows the partial side schematic view of FIG. 8A where the tower is lowered down till the inner jacks are fully retracted, and the outer jacks subsequently stroked up and pistons engaged through anchor holes on the tower, followed by the inner jacks and pistons being disengaged.
Figure 8D:
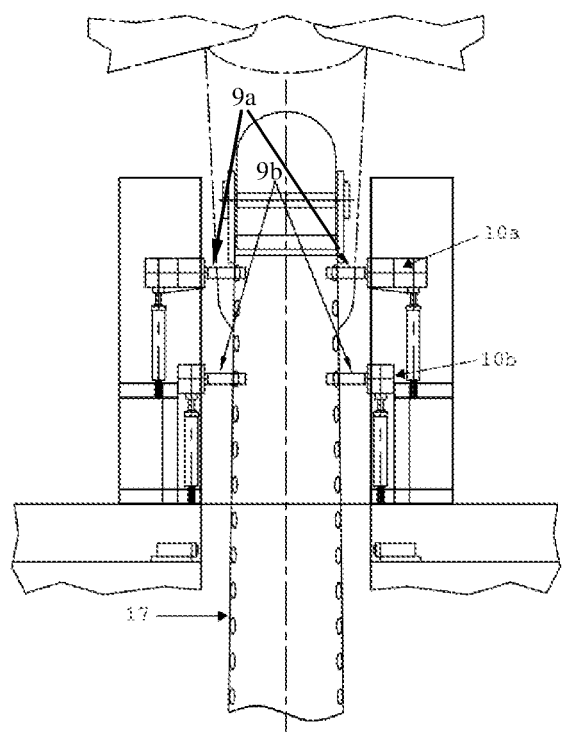
FIG. 8D shows the partial side schematic view of FIG. 8A where the jacking system/mechanism is at a final position where all pistons are engaged through the anchor holes (for example, during maintenance).
Figure 8E:
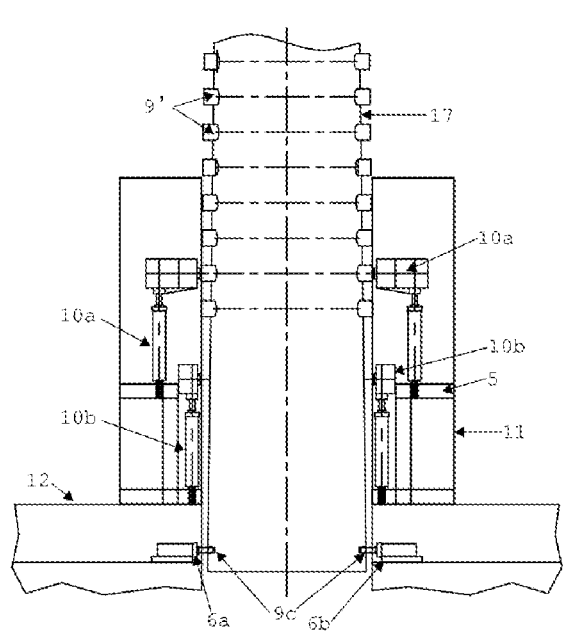
FIG. 8E shows a partial side schematic view of a tower/mast lifting and lowering system at an initial position of a jacking system/mechanism, according to another embodiment.
Figure 8F:
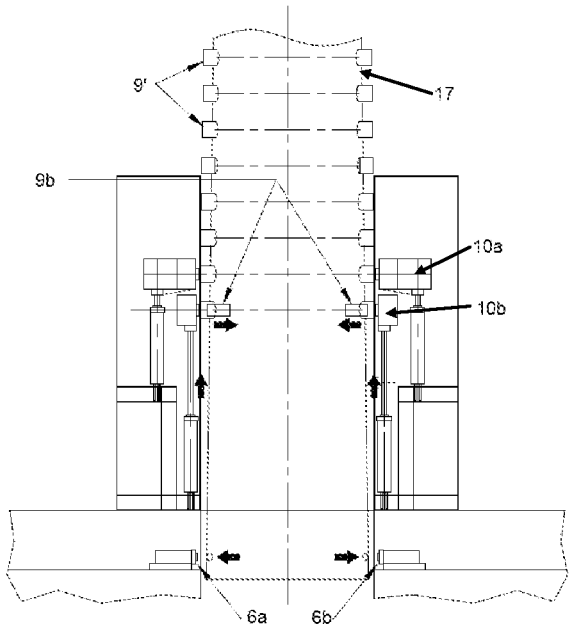
FIG. 8F shows the partial side schematic view of FIG. 8E where inner jacks stroked up and pistons engaged through projecting recesses on the tower.
Figure 8G:
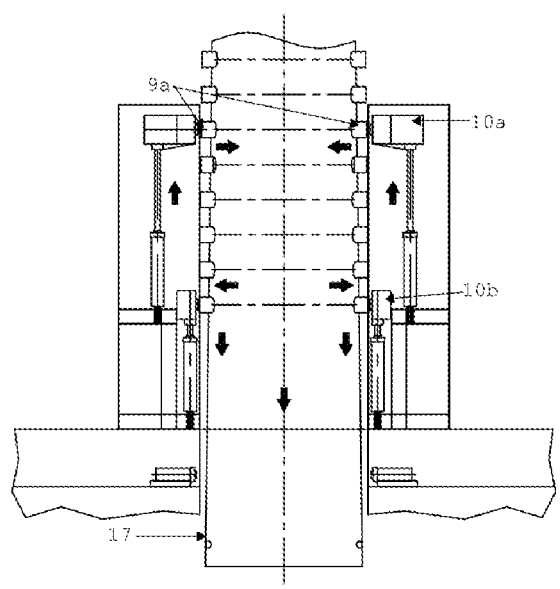
FIG. 8G shows the partial side schematic view of FIG. 8E where the tower is lowered down till the inner jacks are fully retracted, and the outer jacks subsequently stroked up and pistons engaged through projecting recesses on the tower, followed by the inner jacks and pistons being disengaged.

The inner jacks 10b may be provided on or extend upwardly from the main deck 10 of the buoyant structure 12. The outer jacks 10a may be provided at an elevation 5 from the main deck 10. This allows the inner jacks 10b and the outer jacks 10a to be arranged elevated from one another. At the initial position of the jacking system/mechanism, which includes the outer jacks 10a and the inner jacks 10b (FIG. 8A), a locking system including locking devices 6a, 6b with pistons 9c extended into complementary niches provide engagement between the mast 17 and the buoyant structure 12. In FIG. 8B, the inner jacks 10b extends to a height such that pistons 9b may be extended into complementary orifices or anchor holes 9 of the mast 17. With this being secured, the pistons 9c of the locking devices 6a, 6b retract to release the engagement between the mast 17 and the buoyant structure 12. In FIG. 8C, the inner jacks 10b retracts to lower the mast 17. The outer jacks 10a then extends to a height such that pistons 9a may be extended into complementary orifices or anchor holes 9 of the mast 17. In FIG. 8D, the outer jacks 10a retracts to further lower the mast 17 and at a final position, the pistons 9b of the inner jacks 10b extend into complementary orifices or anchor holes 9 of the mast 17 to secure the mast 17 in place to facilitate maintenance. The faint lines in FIGS. 8C and 8D represent the components in the respective previous state or position.

FIGS. 8E to 8H shows the lowering of the mast 17 with orifices in accordance with a different embodiment. The orifices may be projecting recesses 9' which protrude outwardly from the outer surface of the mast 17, and are unlike the anchor holes 9 in FIGS. 8A to 8D that are flushed with the outer surface of the mast 17. The outer jacks 10a and the inner jacks 10b, as shown in FIGS. 8E to 8H work similarly to those as described in FIGS. 8A to 8D, respectively.

Figure 8H:
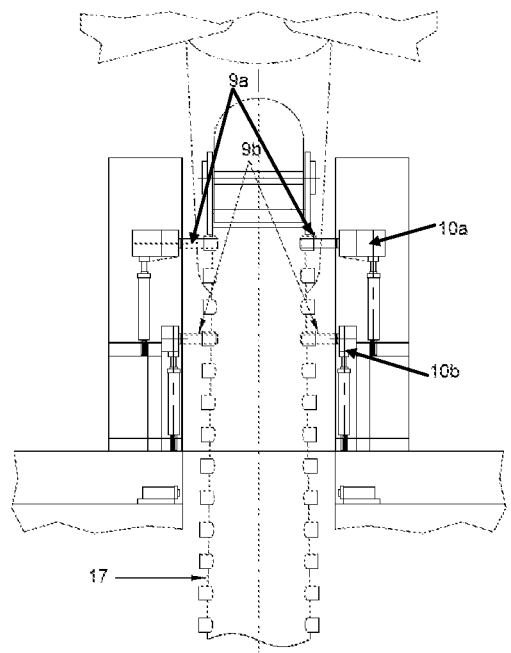
FIG. 8H shows the partial side schematic view of FIG. 8E where the tower is lowered at a desired position (for example, for maintenance).
Figure 9A:
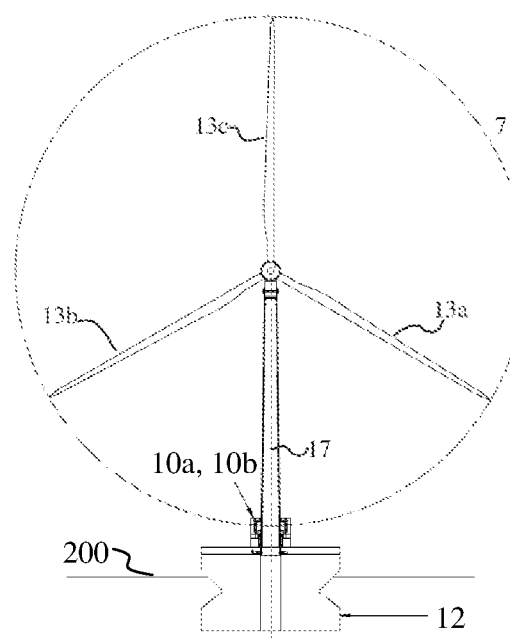
FIG. 9A shows a partial front schematic view of a tower/mast with anchor holes, and rotor blades configured to be adjustable between a vertical operational configuration and a horizontal resting configuration at an initial position of the wind turbine system, according to one embodiment.
Figure 9B:
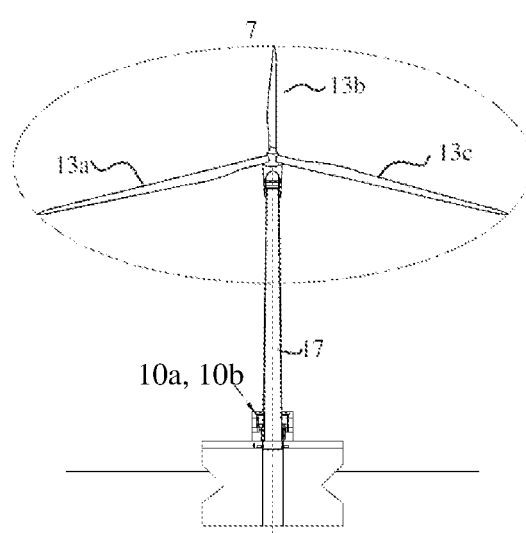
FIG. 9B shows the partial front schematic view of FIG. 9A where the nacelle and rotor blades are tilted to a maintenance position.
Figure 9C:
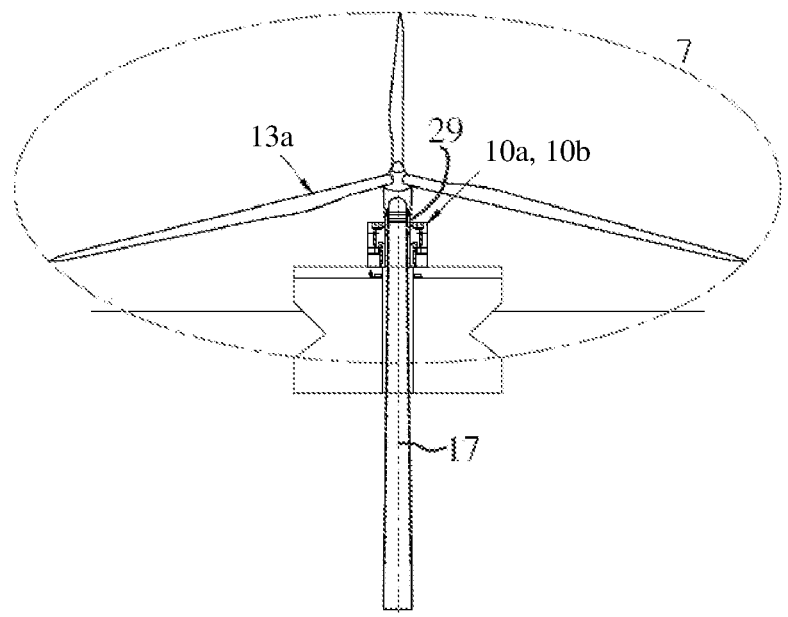
FIG. 9C shows the partial front schematic view of FIG. 9A where the wind turbine system is jacked down by the jacking system of FIGS. 8A to 8D, with the rotor blades tilted.
Figure 9D:
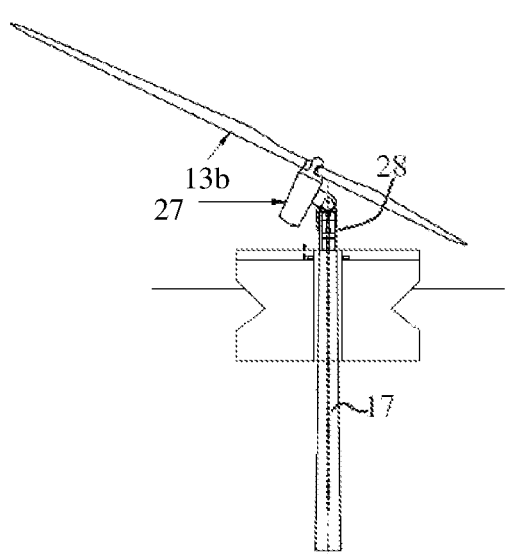
FIG. 9D shows a side schematic view of 9C, where the rotor blades are tilted using a swivel mechanism.
Figure 9E:
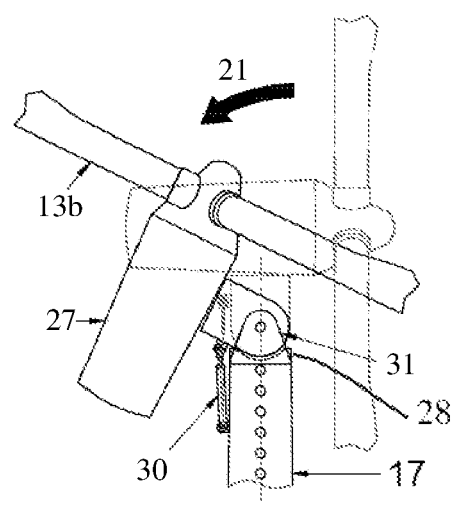
FIG. 9E shows an expanded partial side schematic view of the tilted rotor blades of FIG. 9D, where the faint lines depict an initial (untilted) position of the rotor blades of FIG. 9A.

While the mast 17 may be lowered as described in FIGS. 8A to 8H (where the faint lines in FIGS. 8D and 8H depict the rotor assembly 15), the rotor assembly 15 of the wind turbine system 202 may be tilted, for example, using a swivel mechanism, to even further lower the overall height of the wind tower system 202. The use of the swivel mechanism may be provide an alternative to the use of the caisson 38 to safely facilitate maintenance and repair works on the rotor blades and/or rotor assembly. The tilting of the rotor assembly 15 may take place prior or at the same time of lowering the mast 17, and may be described in more details with reference to examples shown in FIGS. 9A to 9E. In FIG. 9A, the rotor blades 13a, 13b, 13c having the rotational arc 7 may be locked. The drive gear system inside the nacelle 27 may be disconnected as an secondary gear system 28 with the aid of a tilting mechanism 30 (FIGS. 9D and 9E) enables the full rotary assembly 15 to be rotated about a tower hinge 31 such that rotor blades 13a, 13b, 13c are tilted from 0 degrees (substantially parallel to the vertical axis 19), as shown by the faint lines of FIG. 9E, towards about 180 degrees (substantially perpendicular to the vertical axis 19) as indicated by an arrow 21 (FIG. 9E) and the rotary assembly may be locked into a lowering position 29 as shown in FIG. 9D. The secondary gear system 28 and the tilting mechanism 30 may provide for the swivel mechanism. The jacking mechanism with the inner jacks 10a and the outer jacks 10b may lower the mast 17 with the rotary assembly 15 tilted as shown in FIG. 9C.

Figure 14A:
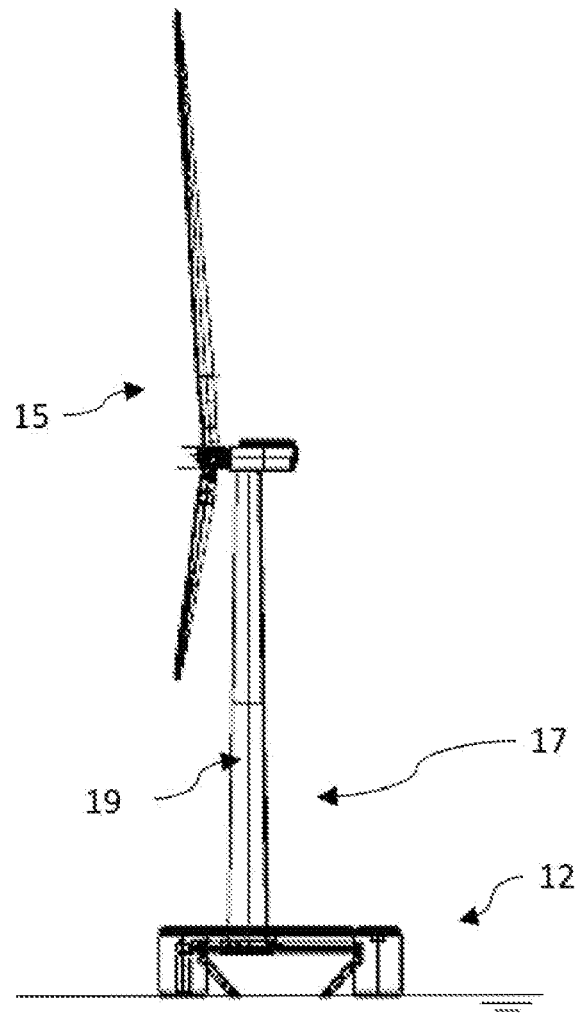
FIG. 14A shows a side schematic view of a tower/mast having a rack and pinion mechanism for lowering/raising system, according to one embodiment.
Figure 14B:
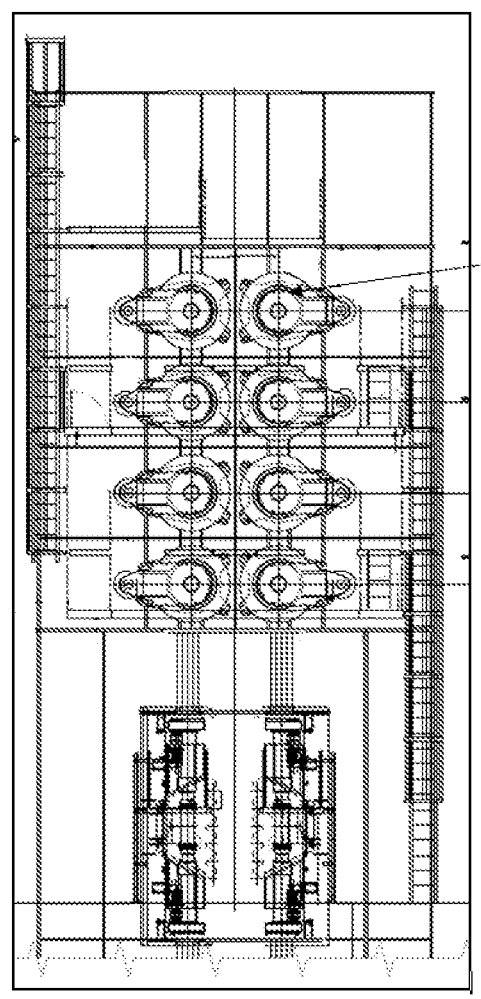
FIG. 14B shows an expanded partial front view of the rack and pinion mechanism of FIG. 14A.

In a different embodiment, instead of the hydraulic jacking mechanism (FIGS. 8A to 8H), the lowering and raising of the buoyant structure 12 with respect to the mast 17 may be performed using another jacking mechanism, e.g. a rack and pinion mechanism 26 as shown in FIGS. 14A and 14B.

Figure 10:
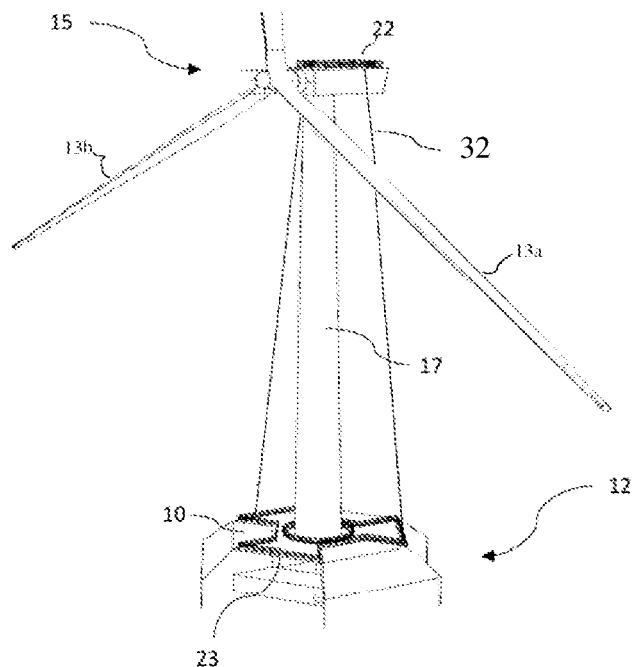
FIG. 10 shows a partial perspective schematic view of a tower/mast and portable sky walk deck in a resting position on a main deck, according to one embodiment.
Figure 11:
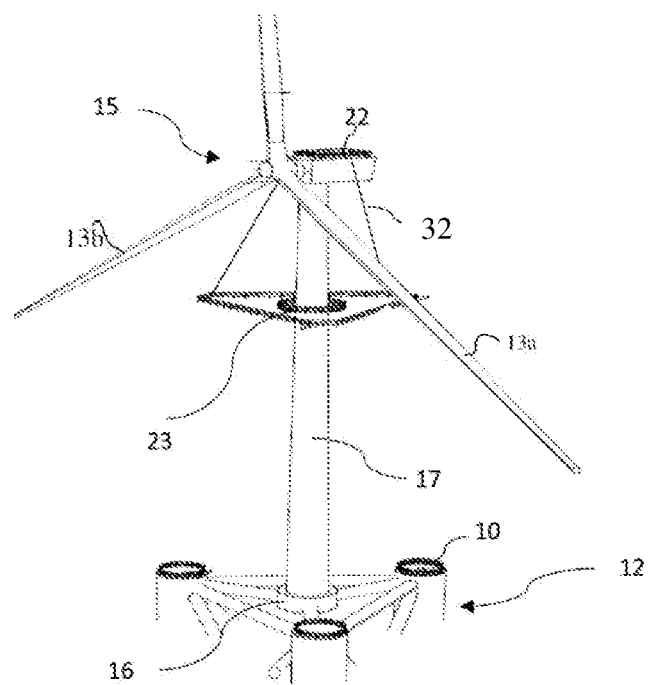
FIG. 11 shows a partial perspective schematic view of a tower/mast with a sky walk deck in a position to conduct inspection, repair on rotor blades, nacelle and engine room of the wind turbine system, according to one embodiment.

A hoisting support platform may be further provided as described in more details with reference to examples shown in FIGS. 10 to 12. The hoisting support platform 23 may be lowered and raised with respect to the mast 17 in order to prove safe and easy access for maintenance, repair and inspection activities performed by offshore workers. The hoist support platform 23 may be located on the main deck 10. The platform 23 may be hoisted up by wind wires 32 alongside the wind mast/tower 17. The hoist support platform 23 may also be connected to a plurality of hoisting winches 22 that are located on the engine room 18 of the wind turbine system 202.

It should be noted that FIGS. 10 and 12 each shows a buoyant structure 12 having a main deck and a hull with different configurations as compared to the buoyant structures described earlier. It should be appreciated that other configurations may also be possible depending on the needs of the buoyant structure (or structure) and such configurations should not be limited. Meanwhile, FIG. 11 shows a buoyant structure having columns, and thus is different from those of FIGS. 10 and 12. The variations in these figures are merely to show that the hoisting support platform 23 may be accommodate in different variations of buoyant structures (or structures).

In addition to the wind wires 32, the hoist support platform 23 may be supported by rollers 33 arranged between the support platform 23 and the mast 17, as described in examples of FIGS. 13A and 13B. The hoist support platform 23 may be coupled to a plurality of roller box channels 34 via a roller 33 in each of the roller box channels 34, these channels 34 may be positioned in a substantially full length of the wind mast/tower 17. The roller box channels 34 and the rollers 33 may provide as spacers between the hoist support platform 23 and the mast 17.

A currently available system in the market may include telescopic design to bring the tower/mast 17 to a lowered height. However, such existing system does not have the novel component in the design as described above which includes at least the jacking mechanism and the locking mechanism. The advantage of this swivel mechanism is the ability to further bring down the total height of the wind turbine system and the provision of enclosure (caisson parking) for safe maintenance and inspection of the rotor blades.

As described above, the design (i.e., the apparatus 100 of FIG. 1A) in accordance with various embodiments may also have the ability to allow the full rotary assembly to be lowered upwards or downwards. Current (existing) operation requires inspection and maintenance of the rotor blades to be performed at extreme high heights. The offshore environment presents a continuous additional challenge, as the pitch and roll excitations generate additional movements of the rotor assembly at such great heights. It is important to establish working and inspection conditions that eliminate or at least significantly reduce the need for inspection at such height and excitations delivered by the offshore environment. This is a great/significant safety benefit.

The method as described herein in accordance with various embodiments, when used for offshore operations, is to bring the full rotary assembly to the main deck or almost at main deck level—such ability is not provided in existing systems. The blade inspection may therefore be performed in a protected space, away from wind, sea and waves.

A further benefit may be the significant cost saving of minimizing the requirement of bringing out or mobilizing a dedicated maintenance support vessel or barge. Even when such a barge or vessel is performing maintenance and repair tasks, the support vessel crew may be working at great heights by utilizing the vessel and/or barge crane, thereby once again compromising the safety of the support vessel crew.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An apparatus (100) for adjusting a wind turbine system (202), the apparatus comprising:
a structure (102) comprising a top surface opening and a bottom surface opening opposite to the top surface opening; and
a jacking mechanism (104), characterized in that
the structure (102) is configured to receive a mast (140, 17) of the wind turbine system (202) through the top surface opening and the bottom surface opening;
the jacking mechanism (104) is operable to raise or lower the structure (102) with respect to the mast (140, 17) of the wind turbine system (202), wherein the structure (102) is configured to be raised or lowered along a substantially entire length of the mast (140, 17); and
the apparatus (100) further includes a locking mechanism (106) configured to releasably secure the structure (102) to the wind turbine system (202).

2. The apparatus (100) as claimed in claim 1, wherein the jacking mechanism (104) is disposed on the structure (102).

3. The apparatus (100) as claimed in claim 1, wherein the jacking mechanism (104) comprises
a hydraulic jacking mechanism (11).

4. The apparatus (100) as claimed in claim 1, wherein the structure (102) comprises a buoyant structure (12) including a hull (3) having an outer hull shape of geodesic horizontal cross-section, wherein the top surface opening is a deck opening (16) of the buoyant structure (12) and the bottom surface opening is a keel opening of the buoyant structure (12).

5. The apparatus (100) as claimed in claim 1, further comprising a caisson (38) configured to receive a rotor blade of a plurality of rotor blades (13a, 13b, 13c) of the wind turbine system (202), the caisson (38) being installed onto the structure (102).

6. The apparatus (100) as claimed in claim 5, wherein the caisson (38) comprises at least one of the following:
a pocket for the rotor blade (13a, 13b, 13c) to park therein;
a caisson opening (8) for the rotor blade (13a, 13b, 13c) to enter into the caisson (38);
a stairway (54) to accommodate access to at least part of the received rotor blade (13a, 13b, 13c); or
a sleeve configured to encircle at least part of the mast (140, 17) of the wind turbine system (202).

7. The apparatus (100) as claimed in claim 5, further comprising a barrel assembly (50) comprising a storage unit (51) configured to hold a replacement rotor blade, a barrel configured to move the replacement rotor blade into the caisson (38) for assembly onto the wind turbine system (202) when performing a replacement of rotor blade for the wind turbine system (202), and a gear mechanism (52) configured to operate movements of the barrel.

8. The apparatus (100) as claimed in claim 7, further comprising a robotic arm configured to assemble the replacement rotor blade onto the wind turbine system (202).

9. The apparatus (100) as claimed in claim 1, further comprising at least one of the following:
a swivel mechanism configured to adjust an assembly (15) comprising rotor blades (13a, 13b, 13c), a nacelle (27) and an engine room (18) of the wind turbine system (202) between an operational position to a docking position, wherein at the operational position, the rotor blades (13a, 13b, 13c) are at a 0-180 degree position along a vertical plane (19) that is substantially parallel to a longitudinal axis of the mast (140, 17), and at the docking position, the rotor blades (13a, 13b, 13c) are positioned along a tilted plane at an angle with respect to the longitudinal axis of the mast (140, 17), the angle being more 0 degree but less than 180 degree; or
a hoisting support platform (23) configured to provide access to the mast (140, 17) of the wind turbine system (202), the hoisting support platform (23) being lifted up or down alongside the mast (140, 17).

10. A system comprising:
an apparatus (100) as claimed in claim 1; and
a mast (140, 17) of a wind turbine system (202) receivable by the structure (102) of the apparatus (100), characterized in that the apparatus (100) and the mast (140, 17) are configured to work cooperatively with each other to raise or lower the mast (140, 17) with respect to the structure (102) of the apparatus (100) along the substantially entire length of the mast (140, 17), or to lock the mast (140, 17) to the structure (102).

11. The system as claimed in claim 10, wherein the mast (140, 17) comprising:
an exterior body;
a plurality of mating elements (142) disposed along a substantially entire length of the exterior body of the mast (140, 17), each of the plurality of mating elements (142) configured to releasably couple to a complementary mating component (144) provided by the structure (102),
wherein the mast (140, 17) is configured to be received by the structure (102) through a top surface opening of the structure (102) and a bottom surface of the structure (102), the bottom surface being opposite to the top surface opening; and
the plurality of mating elements (142) and the complementary mating component (144) are configured to facilitate an operation of a jacking mechanism (104) disposed on the structure (102) to raise or lower the structure (102) with respect to the mast (140, 17) along a substantially entire length of the mast (140, 17).

12. A method (120) for adjusting a wind turbine system (202), the method (120) comprising:
receiving a mast (140, 17) of the wind turbine system (202); and
raising or lowering a structure (102) with respect to the mast (140, 17) of the wind turbine system (202), characterized in that
the mast (140, 17) is received through a top surface opening and a bottom surface opening of the structure (102), the bottom surface opening being opposite to the top surface opening;
the structure (102) is raised or lowered with respect to the mast (140, 17) of the wind turbine system (202) along a substantially entire length of the mast (140, 17), wherein the step of raising or lowering the structure (102) with respect to the mast (140, 17) of the wind turbine system (102) along the substantially entire length of the mast (140, 17) is performed by using a jacking mechanism (104); and the method (120) further includes the step of releasably securing the structure (102) to the wind turbine system (202).

13. The method (120) as claimed in claim 12, wherein the step of raising or lowering the structure (102) comprises operating a hydraulic jacking mechanism (11) comprising a plurality of inner jacks (10b) and a plurality of outer jacks (10a), wherein the plurality of inner jacks (10b) and the plurality of outer jacks (10a) are arranged extending upwardly from the structure (102) and spaced apart in elevation from each other.

14. The method (120) as claimed in claim 13, wherein the step of raising the structure (102) comprises:

disabling a locking mechanism (106) to release engagement between the structure (102) and the wind turbine system (202), extending a piston (9b) of at least one inner jack (10b) to engage a first complementary orifice provided along the mast (140, 17) of the wind turbine system (202), wherein the first complementary orifice is one of a plurality of complementary orifices (9) disposed along the substantially entire length of the mast (140, 17), and retracting the at least one inner jack (10b); and wherein the step of lowering the structure (102) comprises:

retracting a piston (9b) of at least one inner jack (10b) to release engagement with a first complementary orifice provided along the mast (140, 17) of the wind turbine system (202), wherein the first complementary orifice is one of a plurality of complementary orifices (9) disposed along the substantially entire length of the mast (140, 17), extending at least one outer jack (10a) with a piston (9a) of the at least one outer jack (10a) engaged with a second complementary orifice provided along the mast (140, 17) of the wind turbine system (202), wherein the second complementary orifice is another one of the plurality of complementary orifices (9) disposed along the substantially entire length of the mast (140, 17), retracting the piston (9a) of the at least one outer jack (10a) to release engagement with the second complementary orifice; and enabling a locking mechanism (106) to secure engagement between the structure (102) and the wind turbine system (202).

15. The method (120) as claimed in claim 14, wherein the step of raising the structure (102) further comprises:

retracting the piston (9b) of the at least one inner jack (10b) to release engagement with the first complementary orifice, extending a piston (9a) of at least one outer jack (10a) to engage a second complementary orifice provided along the mast (140, 17) of the wind turbine system (202), wherein the second complementary orifice is another one of the plurality of complementary orifices (9) disposed along the substantially entire length of the mast (140, 17), and retracting the at least one outer jack (10a).

16. The method (120) as claimed in claim 13, wherein the step of lowering the structure (102) further comprises:

prior to enabling the locking mechanism (106), extending the piston (9b) of the at least one inner jack (10b) to engage a third complementary orifice provided along the mast (140, 17) of the wind turbine system (202), wherein the third complementary orifice is yet another one of the plurality of complementary orifices (9) disposed along the substantially entire length of the mast (140, 17), extending the at least one inner jack (10b), and retracting the piston (9b) of the at least one inner jack (10b) to release engagement with the third complementary orifice.

17. The method (120) as claimed in claim 12, wherein the step of raising or lowering the structure (102) comprises operating a rack and pinion mechanism (26).

18. The method (120) as claimed in claim 12, further comprising receiving a rotor blade of a plurality of rotor blades (13a, 13b, 13c) of the wind turbine system (202) in a caisson (38), the caisson (38) being installed onto the structure (102).

19. The method (120) as claimed in claim 18, further comprising moving a replacement rotor blade into the caisson (38) by using a barrel assembly (50) and assembling the replacement rotor blade onto the wind turbine system (202) using a robotic arm.

20. The method (120) as claimed in claim 12, further comprising at least one of the following steps:

adjusting an assembly (15) comprising rotor blades (13a, 13b, 13c), a nacelle (27) and an engine room (18) of the wind turbine system (202) between an operational position to a docking position, wherein at the operational position, the rotor blades (13a, 13b, 13c) are at a 0-180 degree position along a vertical plane (19) that is substantially parallel to a longitudinal axis of the mast (140, 17), and at the docking position, the rotor blades (13a, 13b, 13c) are positioned along a tilted plane at an angle with respect to the longitudinal axis of the mast (140, 17), the angle being more 0 degree but less than 180 degree;

encircling at least part of the mast (140, 17) of the wind turbine system (202) with a sleeve of the caisson (38); or lifting up or down a hoisting support platform (23) alongside the mast (140, 17) of the wind turbine system (202) to provide access to the mast (140, 17).

* * * * *